United States Patent
Yamada et al.

(10) Patent No.: US 10,270,306 B2
(45) Date of Patent: Apr. 23, 2019

(54) MOTOR AND ROTOR

(71) Applicant: ASMO CO., LTD., Shizuoka-ken (JP)

(72) Inventors: Yoji Yamada, Hamamatsu (JP); Takahiro Tsuchiya, Toyohashi (JP); Chie Morita, Kosai (JP)

(73) Assignee: Denso Corporation, Kariya (JP)

( * ) Notice: Subject to any disclaimer, the term of this patent is extended or adjusted under 35 U.S.C. 154(b) by 787 days.

(21) Appl. No.: 14/603,879

(22) Filed: Jan. 23, 2015

(65) Prior Publication Data

US 2015/0222152 A1 Aug. 6, 2015

(30) Foreign Application Priority Data

Jan. 29, 2014 (JP) .................................. 2014-014292
Feb. 13, 2014 (JP) .................................. 2014-025479
May 9, 2014 (JP) .................................. 2014-097744

(51) Int. Cl.
*H02K 5/02* (2006.01)
*H02K 11/02* (2016.01)
(Continued)

(52) U.S. Cl.
CPC ................. *H02K 5/02* (2013.01); *H02K 1/27* (2013.01); *H02K 5/04* (2013.01); *H02K 11/01* (2016.01);
(Continued)

(58) Field of Classification Search
CPC .......... H02K 1/226; H02K 1/243; H02K 5/00; H02K 5/02; H02K 11/20; H02K 11/21
(Continued)

(56) References Cited

U.S. PATENT DOCUMENTS 4,528,473 A 7/1985 Tezuka
6,057,622 A * 5/2000 Hsu ...................... H02K 21/046
310/155

(Continued)

FOREIGN PATENT DOCUMENTS

CN 102290947 A 12/2011
CN 102971943 A 3/2013
(Continued)

OTHER PUBLICATIONS

Japanese Office Action for Application No. 2014-097744; dated Oct. 29, 2017; original office action (3 pages); machine translation of office action (3 pages) (6 pages total).
(Continued)

*Primary Examiner* — Thomas Truong
(74) *Attorney, Agent, or Firm* — Patterson Thuente Pedersen, P.A.

(57) ABSTRACT

A motor includes a stator, a rotor, and a case. The stator includes a stator core and windings. The rotor is provided inside the stator. The rotor includes first and second rotor cores and a field magnet. The first and second rotor cores each includes a core base and claw-shaped magnetic poles. The core bases are opposed to each other and the claw-shaped magnetic poles of the first and second rotor cores are alternately disposed in a circumferential direction. The field magnet is disposed between the core bases in the axial direction. The field magnet is magnetized in the axial direction so as to cause the claw-shaped magnetic poles of the first rotor core and the second rotor core to function respectively as first magnetic poles and second magnetic poles. At least part of an end part of the case in the axial direction is made of a non-magnetic body.

6 Claims, 15 Drawing Sheets

(51) Int. Cl.
*H02K 5/04* (2006.01)
*H02K 1/27* (2006.01)
*H02K 29/08* (2006.01)
*H02K 11/01* (2016.01)

(52) U.S. Cl.
CPC ............ *H02K 29/08* (2013.01); *H02K 1/276* (2013.01); *H02K 1/2713* (2013.01); *Y10T 29/49012* (2015.01)

(58) Field of Classification Search
USPC .................................................. 310/68 B, 89
See application file for complete search history.

(56) References Cited

U.S. PATENT DOCUMENTS

| | | | |
|---|---|---|---|
| 2005/0118044 A1* | 6/2005 | Inoue .................... | F02M 37/08 417/423.7 |
| 2005/0206254 A1* | 9/2005 | Tsuge ................... | H02K 5/1735 310/68 B |
| 2011/0309707 A1* | 12/2011 | Kato ...................... | H02K 1/146 310/156.54 |
| 2013/0026888 A1* | 1/2013 | Migita ................... | H02K 29/08 310/68 B |
| 2013/0106208 A1 | 5/2013 | Yamada et al. | |
| 2013/0207502 A1 | 8/2013 | Yamada et al. | |
| 2013/0300242 A1* | 11/2013 | Yamada ............... | H02K 21/044 310/156.08 |
| 2013/0313938 A1 | 11/2013 | Yamada et al. | |
| 2014/0252904 A1 | 9/2014 | Mikami et al. | |

FOREIGN PATENT DOCUMENTS

| | | | | |
|---|---|---|---|---|
| CN | 103095014 A | 5/2013 | | |
| CN | 103259353 A | 8/2013 | | |
| JP | S56-051449 U | 9/1979 | | |
| JP | S59-135087 U | 9/1984 | | |
| JP | H118 9163 A | 3/1999 | | |
| JP | 2001-141097 A | 5/2001 | | |
| JP | 2010 263697 A | 11/2010 | | |
| JP | 2011-120419 A | 6/2011 | | |
| JP | WO 2012067223 A1 * | 5/2012 | ........... | H02K 21/044 |
| JP | 2012-115085 | 6/2012 | | |
| JP | 2013-099097 | 5/2013 | | |
| JP | 2013-099105 A | 5/2013 | | |
| JP | 2013-169071 A | 8/2013 | | |
| JP | 2013 226024 A | 10/2013 | | |

OTHER PUBLICATIONS

Japanese Office Action for Application No. 2014-014292, dated Sep. 14, 2017, (Original Notification of Reasons for Refusal—2 pgs; Machine Translation—4 pgs)(6 pgs. total).

Japanese Office Action for Application No, 2014-025479, dated Sep. 15, 2017, (Original Notification of Reasons for Refusal—3 pgs, Machine Translation—4 pgs) (7 pgs. total).

Chinese Office Action for Application No. 201510041653.9, dated Mar. 28, 2018 (11 pgs).

\* cited by examiner

MOTOR AND ROTOR

BACKGROUND OF THE INVENTION

The present invention relates to a motor and a rotor.

Conventionally, as a rotor to be used in a motor, a rotor having a so-called Lundell-type structure is known as described in Japanese Patent Laid-Open Publication Nos. 2012-115085 and 2013-99097. Such a rotor includes a plurality of rotor cores which each have a plurality of claw-shaped magnetic poles in the circumferential direction, and are combined together. A field magnet is disposed between the rotor cores in the axial direction so that the claw-shaped magnetic poles alternately function as different magnetic poles. Further, such a rotor is provided so as to be rotatable on the inner side of a stator having a winding. The rotor and the stator are housed in a case, which includes a yoke housing formed into a cylindrical shape with a bottom part and a cover part for closing an opening part of the yoke housing.

In a motor as described above, a yoke housing (a bottom part thereof) which is made of a magnetic body is located on one side in the axial direction of the rotor. This may cause leakage of part of magnetic flux, which is generated from the field magnet of the rotor, to the yoke housing, thereby deteriorating power output characteristics.

Moreover, in a motor as described above, a sensor magnet which rotates integrally with the rotary shaft is disposed on a side part of the Lundell-type rotor in the axial direction. Further, a magnetic detection part is disposed on the stator side (a fixed side such as a housing etc.) so as to face the sensor magnet in the axial direction. The magnet detection part detects the rotation of the sensor magnet.

However, in a Lundell-type motor as described above, the permanent magnet of the rotor is magnetized in the axial direction. For that reason, magnetic flux is likely to leak to the housing side in the axial direction from the rotor. Therefore, magnetic flux leaked to the housing side may affect the magnetic detection part, thereby lowering the detection accuracy. In this case, it is possible to suppress leakage of magnetic flux from the rotor to the housing side (the side of the magnetic detection part) by increasing the clearance in the axial direction between the housing supporting the magnetic detection part and the rotor. However, in this case, the size of the motor in the axial direction inevitably increases.

SUMMARY OF THE INVENTION

It is an object of the present invention to provide a motor and a rotor which can suppress leakage flux.

To achieve the above object, a motor according to a first aspect of the present invention includes a stator, a rotor, and a case, which houses the stator and the rotor. The stator includes a stator core having a plurality of teeth extending to a radially inner side, and windings wound around the teeth. The rotor is rotatably provided on an inner side of the stator. The rotor includes first and second rotor cores and a field magnet. The first and second rotor cores each includes a core base having a substantially disc shape and a plurality of claw-shaped magnetic poles. The plurality of claw-shaped magnetic poles are provided at equal intervals in an outer circumferential part of the core base. Each of the claw-shaped magnetic poles protrudes to a radially outer side and extends in an axial direction. The core bases of the first and second rotor cores are opposed to each other. The claw-shaped magnetic poles of the first and second rotor cores are alternately disposed in a circumferential direction. The field magnet is disposed between the core bases in the axial direction. The field magnet is magnetized in the axial direction so as to cause the claw-shaped magnetic poles of the first rotor core to function as first magnetic poles, and the claw-shaped magnetic poles of the second rotor core to function as second magnetic poles. At least part of an end part of the case in the axial direction is made of a non-magnetic body.

A rotor according to a second aspect of the present invention includes first and second rotor cores and a field magnet. The first and second rotor cores each including a core base and a plurality of claw-shaped magnetic poles. The plurality of claw-shaped magnetic poles is provided at equal intervals in an outer circumferential part of the core base. Each of the claw-shaped magnetic poles protrudes to a radially outer side and extends in an axial direction. The core bases of the first and second rotor cores are opposed to each other. The claw-shaped magnetic poles of the first and second rotor cores are alternately disposed in a circumferential direction. The field magnet is disposed between the core bases in the axial direction. The field magnet is magnetized in the axial direction so as to cause the claw-shaped magnetic poles of the first rotor core to function as first magnetic poles, and the claw-shaped magnetic pole of the second rotor core to function as second magnetic poles. At least one of the first and second rotor cores is provided with a magnetic adjustment member for adjusting thickness of the first and second rotor cores in the axial direction in a laminated manner in the axial direction.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereafter, a first embodiment of a motor will be described with reference to FIGS. 1 to 4.

Figure 1:
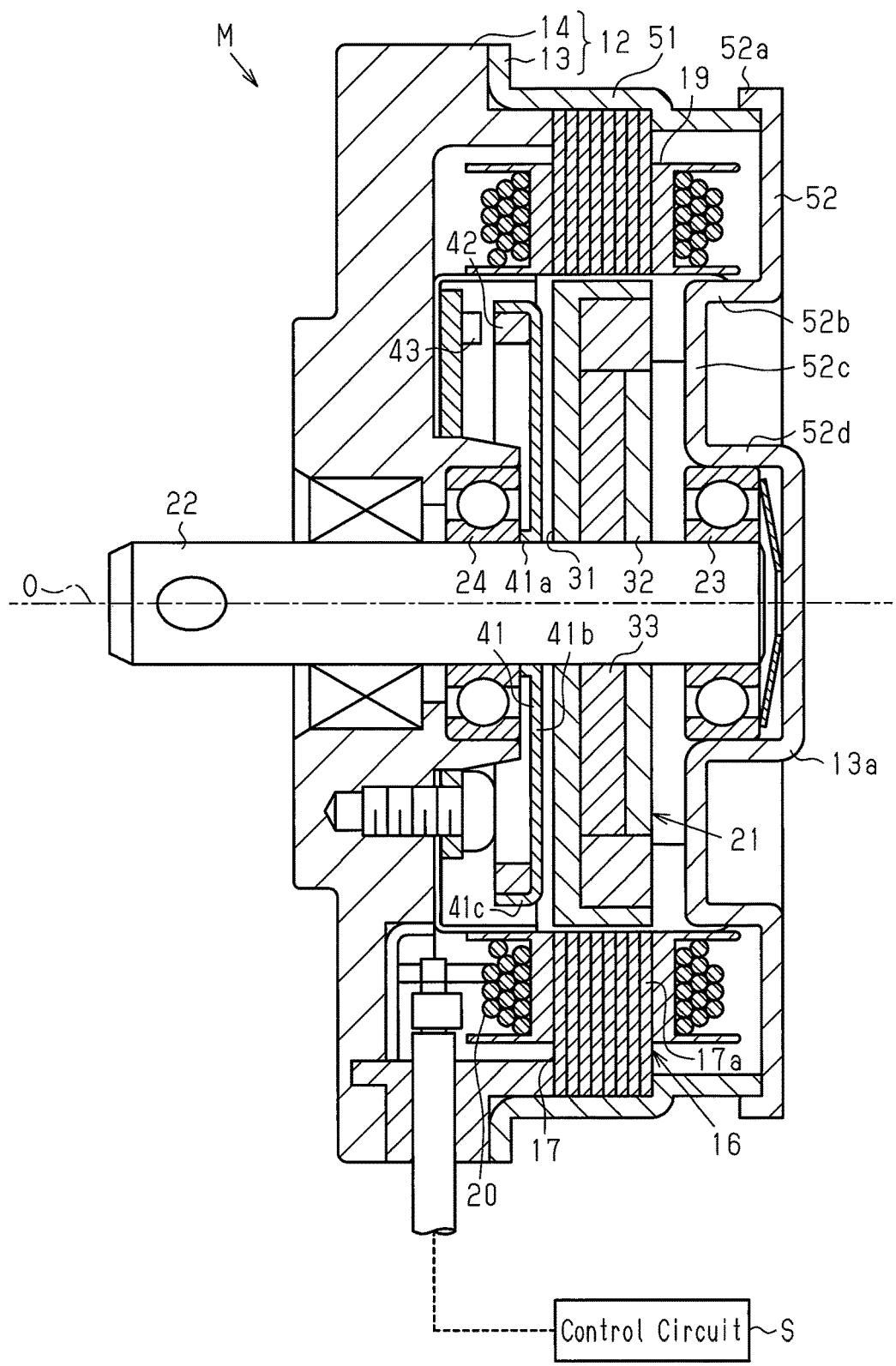
FIG. 1 is a sectional view of a brushless motor relating to a first embodiment of the present invention.

As shown in FIG. 1, a case 12 for a brushless motor M as a motor includes a yoke housing 13 formed into a substantially cylindrical shape with a bottom part, and an end plate 14 as a cover part which closes an opening part of the yoke housing 13 and is made of a resin material which is a non-magnetic body.

As shown in FIG. 1, a stator 16 is fixed to an inner peripheral surface of the yoke housing 13. The stator 16 includes a stator core 17 having a plurality of teeth 17a extending to the radially inner side, and a winding 20 wound around a tooth 17a of the stator core 17 with an insulator 19 interposed therebetween. Supply of a drive current to the winding 20 from an external control circuit S causes the stator 16 to generate a rotating magnetic field.

Figure 2:
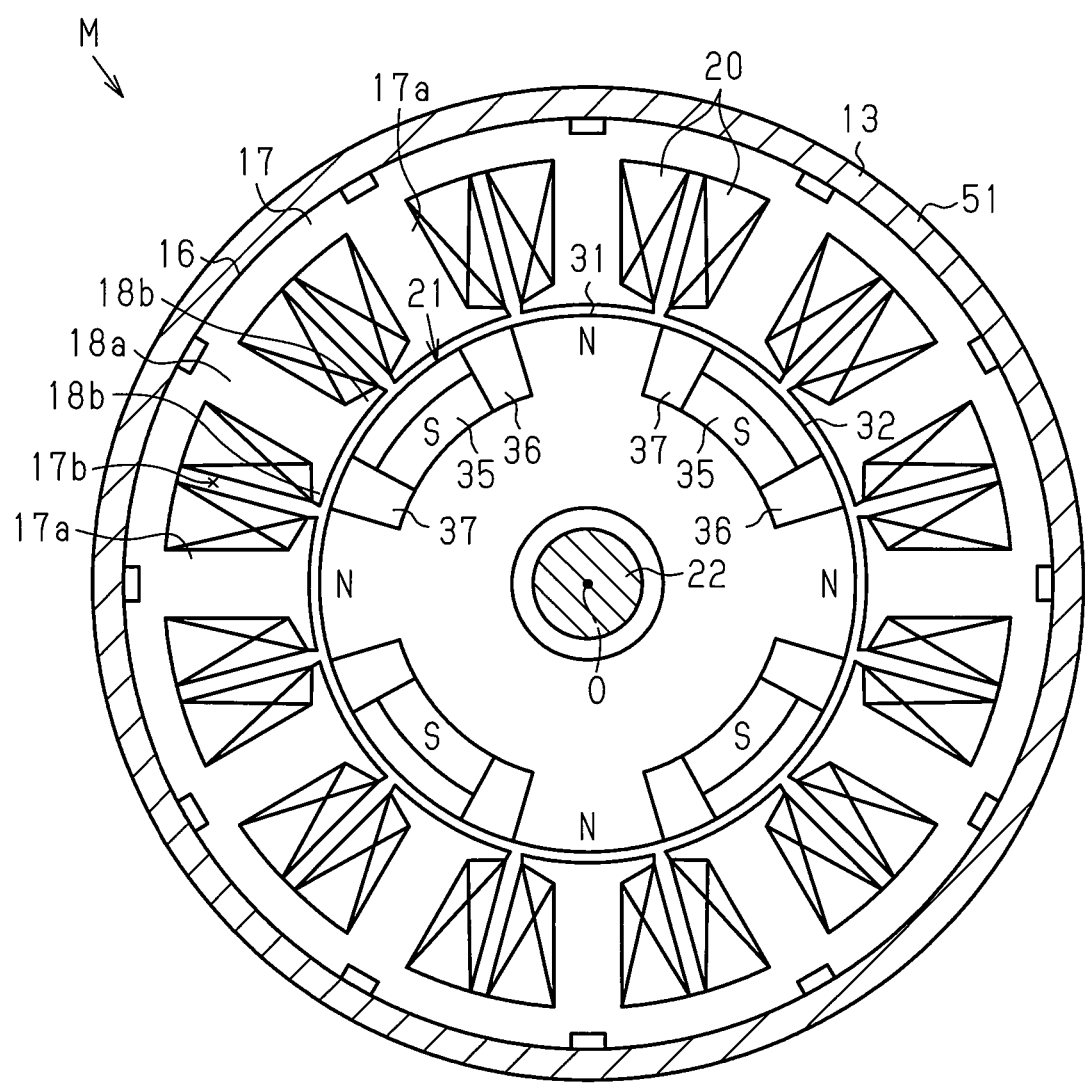
FIG. 2 is a plan view of the brushless motor of FIG. 1.

As shown in FIG. 2, the stator core 17 of the first embodiment has twelve teeth 17a arranged in the circumferential direction. Therefore, the number of slots 17b formed between teeth 17a is also twelve.

As shown in FIG. 2, the tooth 17a includes a winding part 18a, and protrusions 18b which protrude to both sides in the circumferential direction from an end part of the radially inner side of the winding part 18a. The windings 20 of U, V, and W phases each wound around the winding parts 18a in a concentrated winding.

As shown in FIG. 1, a rotor 21 of the brushless motor M has a rotary shaft 22, and is disposed inside the stator 16. The rotary shaft 22 is a metal shaft which is made of a non-magnetic body, and is supported to be rotatable about its center-axis O by bearings 23 and 24 which are respectively supported at respective centers of the bottom part 13a of the yoke housing 13 and the end plate 14.

Figure 3:
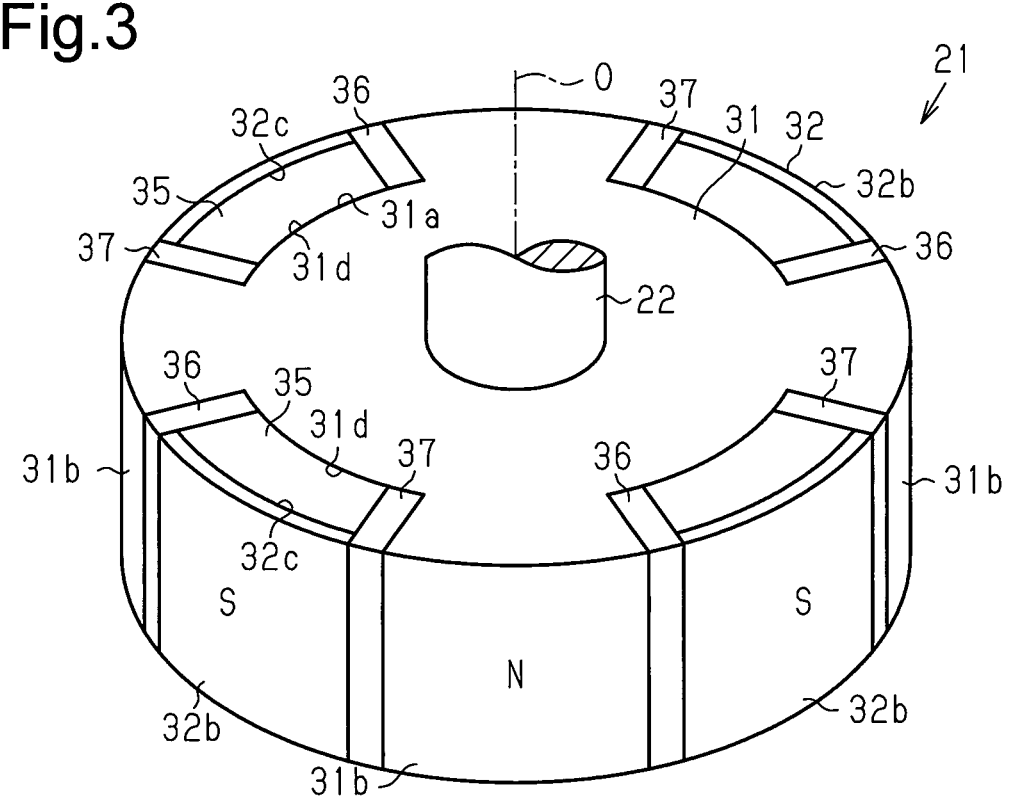
FIG. 3 is a perspective view of a rotor of FIG. 2.
Figure 4:
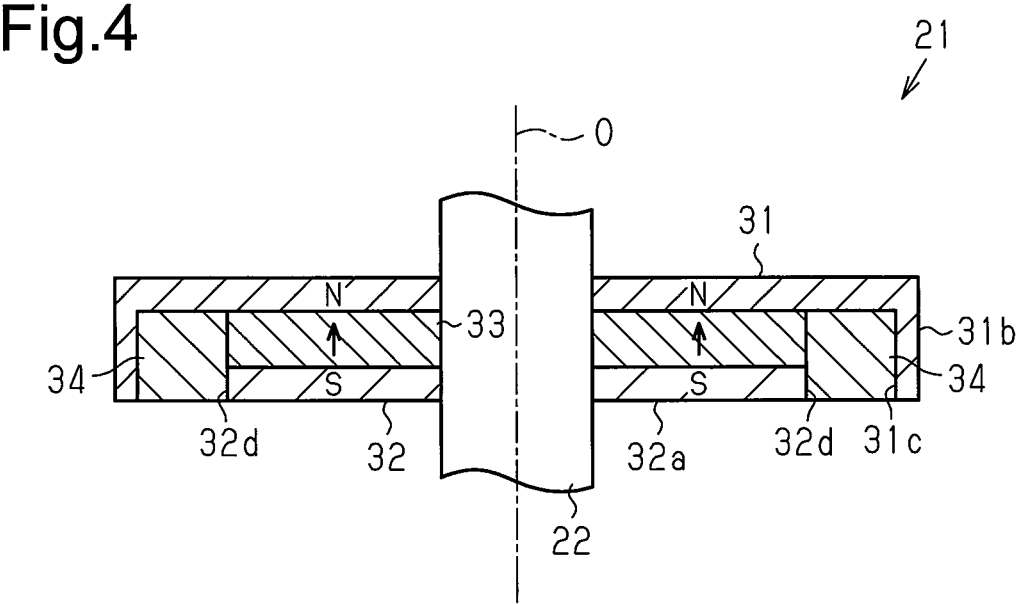
FIG. 4 is a sectional view of the rotor of FIG. 3.

As shown in FIGS. 3 and 4, the rotor 21 includes: a first and second rotor cores 31 and 32 and a field magnet 33. The first and second rotor cores 31 and 32 are press-fitted into and fixed to the rotary shaft 22 with a clearance defined therebetween in the axial direction. The field magnet 33 is arranged between the first and second rotor cores 31 and 32 in the axial direction. Further, the rotor 21 includes back-face auxiliary magnets 34 and 35, and inter-pole magnets 36 and 37.

As shown in FIGS. 3 and 4, the first rotor core 31 is formed with a plurality (four in the first embodiment) of first claw-shaped magnetic poles 31b arranged at equal intervals in the outer peripheral part of a first core base 31a having a substantially disc shape. The first claw-shaped magnetic pole 31b protrudes to the radially outer side and extends in the axial direction.

As shown in FIGS. 3 and 4, the second rotor core 32 has the same shape as that of the first rotor core 31, and is formed with a plurality of second claw-shaped magnetic poles 32b arranged at equal intervals in the outer peripheral part of a second core base 32a having a substantially disc shape. The second claw-shaped magnetic pole 32b protrudes to the radially outer side and extends in the axial direction. Further, the rotary shaft 22 is press-fitted into central holes of the first and second rotor cores 31 and 32 so that the first and second rotor cores 31 and 32 are fixed with the rotary shaft 22. In this configuration, the second rotor core 32 is assembled to the first rotor core 31 in such a way that each of the second claw-shaped magnetic poles 32b is disposed between the first claw-shaped magnetic poles 31b adjacent to each other in the circumferential direction, and that a field magnet 33 is disposed (sandwiched) in the clearance in the axial direction between the first core base 31a and second core base 32a opposed to each other.

The field magnet 33 is a magnet such as a ferrite magnet or a neodymium magnet. The field magnet 33 is formed into an annular shape having a central hole, and is magnetized in the axial direction so that the first claw-shaped magnetic pole 31b functions as a first magnetic pole (an N-pole in the first embodiment) and the second claw-shaped magnetic pole 32b functions as a second magnetic pole (an S-pole in the first embodiment). That is, the rotor 21 of the first embodiment is a rotor having a so-called Lundell-type structure and using the field magnet 33. The rotor 21 is configured such that four of the first claw-shaped magnetic poles 31b which each become an N-pole, and four of the second claw-shaped magnetic poles 32b which each become an S-pole are alternately disposed in the circumferential direction, and the number of poles is eight (the number of pole pairs is four). That is, in the first embodiment, the number of poles of the rotor 21 is "8", and the number of teeth 17a of the stator 16 is "12".

The back-face auxiliary magnet 34 is disposed between a back face 31c (a radially inner-side face) of each first claw-shaped magnetic pole 31b and the outer peripheral surface 32d of the second core base 32a. The back-face auxiliary magnet 34 has a fan-shaped cross-section in a direction perpendicular to the axis. The back-face auxiliary magnet 34 is magnetized so that a portion in contact with the back face 31c of the first claw-shaped magnetic pole 31b acts as an N-pole which is the same polarity as the first claw-shaped magnetic pole 31b, and a portion in contact with the outer peripheral surface 32d of the second core base 32a acts as an S-pole which is the same polarity as the second core base 32a.

Also, a back-face auxiliary magnet 35 is disposed between a back face 32c of each of the second claw-shaped magnetic pole 32b and the outer peripheral surface 31d of the first core base 31a in a similar manner to the first claw-shaped magnetic pole 31b. The back-face auxiliary magnet 35 has a fan-shaped cross-section in a direction perpendicular to the axis. The back-face auxiliary magnet 35 is magnetized so that a portion in contact with the back face 32c acts an S-pole, and a portion in contact with the outer peripheral surface 31d of the first core base 31a acts as an N-pole. For example, a ferrite magnet can be used as the back-face auxiliary magnets 34 and 35.

As shown in FIGS. 2 and 3, inter-pole magnets 36 and 37 are disposed between the first claw-shaped magnetic pole 31b and the second claw-shaped magnetic pole 32b in the circumferential direction.

Moreover, as shown in FIG. 1, the rotor 21 is provided with a sensor magnet 42 via a magnet fixing member 41 having a substantially disc shape. Specifically, the magnet fixing member 41 has a disc part 41b formed with a boss part 41a in its center, and a tubular part 41c which extends in a tubular shape from outer edge of the disc part 41b. The annular sensor magnet 42 is secured to the magnet fixing member 41 so as to come into contact with the inner peripheral surface of the tubular part 41c and the surface of the disc part 41b. Further, the boss part 41a of the magnet fixing member 41 is externally fitted to the rotary shaft 22 so that the magnet fixing member 41 is located close to the first rotor core 31 and fixed with the rotary shaft 22.

A hall IC 43 serving as the magnetic sensor is provided at the end plate 14 and located at a position axially opposed to the sensor magnet 42. Upon detection of magnetic fields of N-pole and S-pole based on the sensor magnet 42, the hall IC 43 outputs detection signals of H level and L level to the control circuit S. The control circuit S supplies a drive current to the winding 20 based on the detection signals.

The yoke housing 13 of the first embodiment includes a magnetic body part 51 made of iron which is a magnetic body, and a non-magnetic body part 52 made of a non-magnetic metal (such as stainless steel (SUS) and aluminum) which is a non-magnetic body.

Specifically, the yoke housing 13 of the first embodiment includes a magnetic body part 51 which has a substantially cylindrical shape and to which the stator 16 (the stator core 17) is internally fitted, and a non-magnetic body part 52 which has a substantially disc shape and is fixed to one opening part of the magnetic body part 51 to constitute the bottom part 13*a*. The non-magnetic body part 52 is provided in a plane axially opposed to the rotor 21. The non-magnetic body part 52 includes an outer peripheral having an edge part 52*a*. The edge part 52*a* is configured so that the magnetic body part 51 can be internally fitted to the edge part 52*a*. The non-magnetic body part 52 is fixed with the magnetic body part 51 by internally fitting an end part of the magnetic body part 51 into the edge part 52*a* and welding the relevant portion.

Moreover, the non-magnetic body part 52 includes a tubular part 52*b*, an annular plate part 52*c*, and a bearing housing part 52*d*. The tubular part 52*b* having a tubular shape is located at a position opposing the outer edge of the rotor 21 and extends toward the rotor 21 in the axial direction. The annular plate part 52*c* extends to the radially inner side from the distal end part of the tubular part 52*b* and is opposed to the rotor 21 with a constant distance therefrom in the axial direction. The bearing housing part 52*d* is formed into a tubular shape with a bottom part and extends from the inner edge of the annular plate part 52*c* in a direction away from the rotor 21 along the axial direction. The above described bearing 23 is housed in and retained by the bearing housing part 52*d*.

Next, actions of the brushless motor M configured as described above will be described.

Upon feeding a three-phase drive current to the winding 20 from the control circuit S, a rotating magnetic field is generated in the stator 16 and thereby the rotor 21 is rotationally driven. At this time, rotation of the sensor magnet 42 opposing the hall IC 43 causes the level of detection signal outputted from the hall IC 43 to change depending on the rotational angle (position) of the rotor 21. Based on the detection signal, the control circuit S supplies a three-phase drive current to the winding 20 that changes at optimal timing. Accordingly, a rotating magnetic field is successfully generated, and thereby the rotor 21 is rotationally driven in a continuous and successful manner.

Next, characteristic advantages of the above described embodiment will be described below.

(1) At least a part of an end part in the axial direction of the case 12 is made of a non-magnetic body. Therefore, leakage flux which leaks in the axial direction from the field magnet 33 of the rotor 21 through the first rotor core 31 and the second rotor core 32 will decrease.

(2) The yoke housing 13 formed into a tubular shape with a bottom part includes the magnetic body part 51 and the non-magnetic body part 52. Therefore, the magnetic body part 51 constitutes a part of magnetic path of the stator 16 while the non-magnetic body part 52 suppresses leakage flux leaked to the yoke housing 13 of the rotor 21. Thus, it is possible to improve power output characteristics.

(3) The non-magnetic body part 52 is provided in a plane axially opposed to the rotor 21. Therefore, it is possible to suppress leakage flux leaked to the yoke housing 13 of the rotor 21 while reducing the size of the brushless motor M by arranging the plane which axially opposes the rotor 21 (the annular plate part 52*c* in the first embodiment) close to the rotor 21.

(4) The non-magnetic body part 52 is made of a non-magnetic metal (such as stainless steel (SUS) and aluminum). Therefore, it is possible to ensure the strength of the non-magnetic body part 52.

The first embodiment may be changed as described below.

In the first embodiment, the yoke housing 13 includes the magnetic body part 51 having a substantially cylindrical shape, and the non-magnetic body part 52 having a substantially disc shape and being fixed to one opening part of the magnetic body part 51 to constitute the bottom part 13*a* of the yoke housing 13. This configuration may be modified into a different form. That is, a different configuration may be adopted under a situation in which the non-magnetic body part suppresses leakage flux leaked to the yoke housing of the rotor 21 while the magnetic body part constitutes part of the magnetic path of the stator 16.

Figure 5:
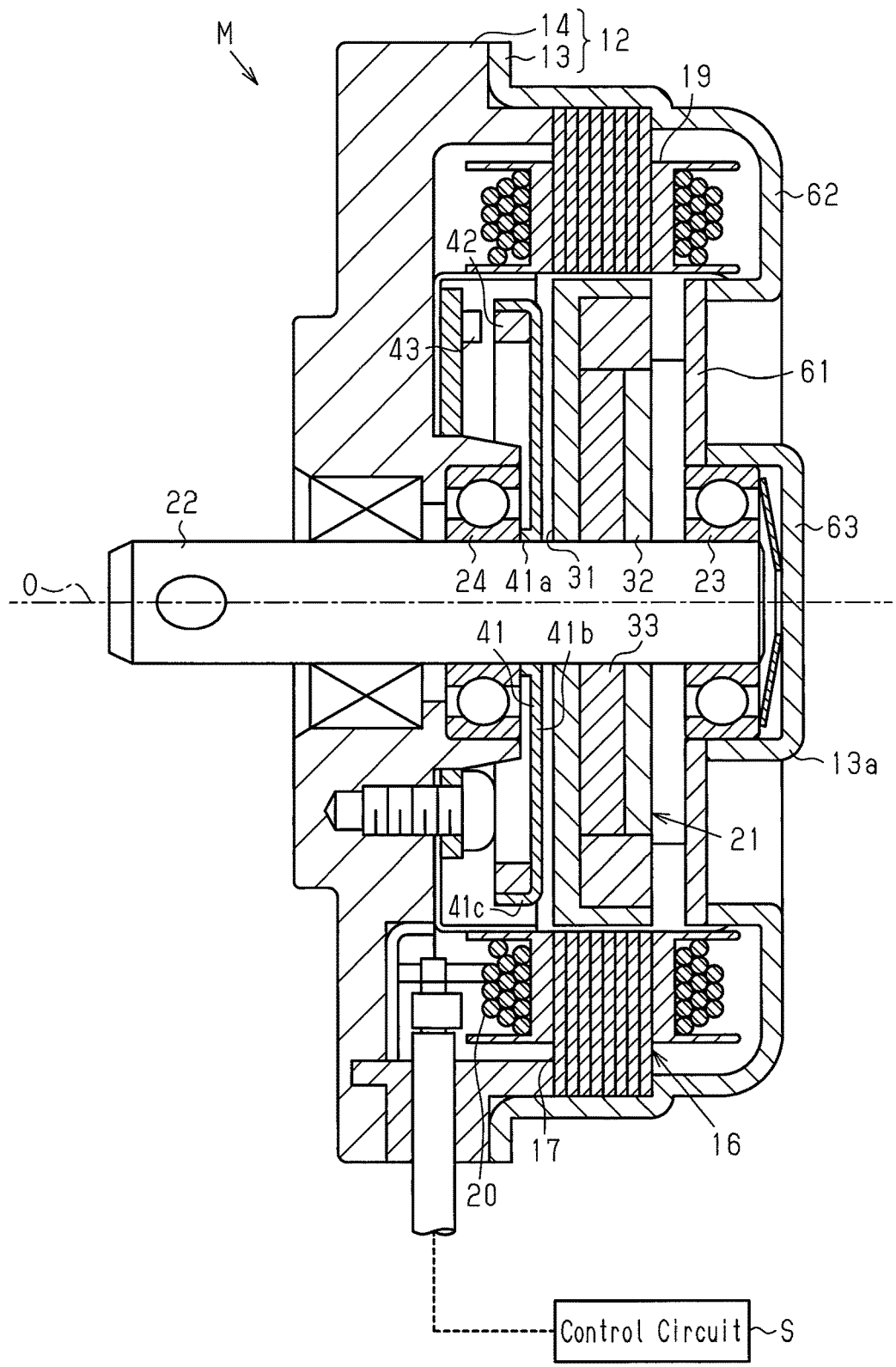
FIG. 5 is a sectional view of a brushless motor in another example of the first embodiment.

For example, the configuration may be changed as shown in FIG. 5. The yoke housing 13 of this example has a general shape same as that of the first embodiment. A non-magnetic body part 61 is arranged only in a portion axially opposed to the rotor 21, namely, a portion corresponding to the annular plate part 52*c* of the first embodiment. Other portions are magnetic body parts 62 and 63.

This configuration allows reduction of the volume of the non-magnetic body part 61 compared with that in the first embodiment. Thus, it is possible to reduce the material cost, for example, when the non-magnetic body part 61 is made of stainless steel (SUS).

Figure 6:
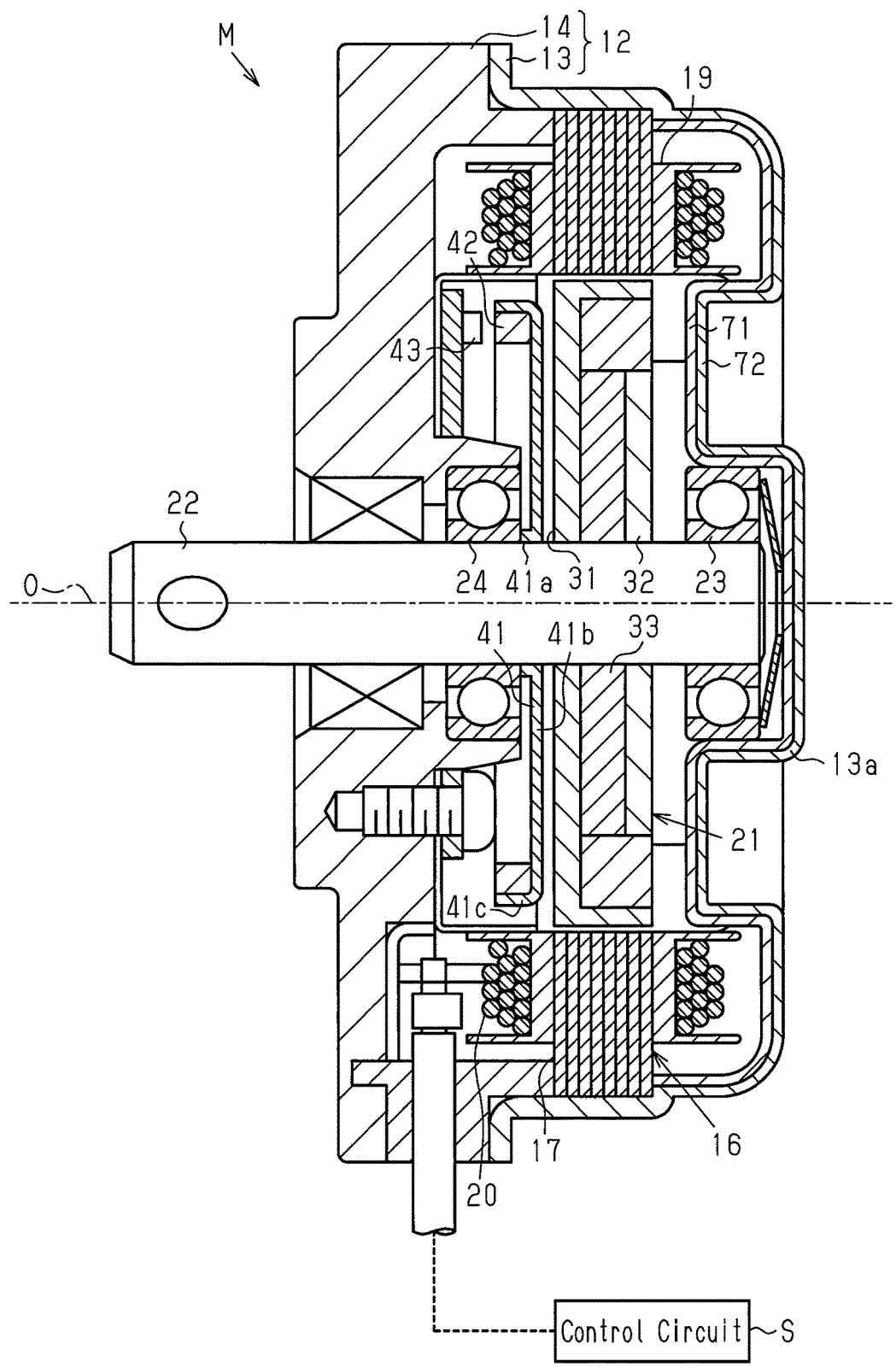
FIG. 6 is a sectional view of a brushless motor in a further example of the first embodiment.
Figure 7A:
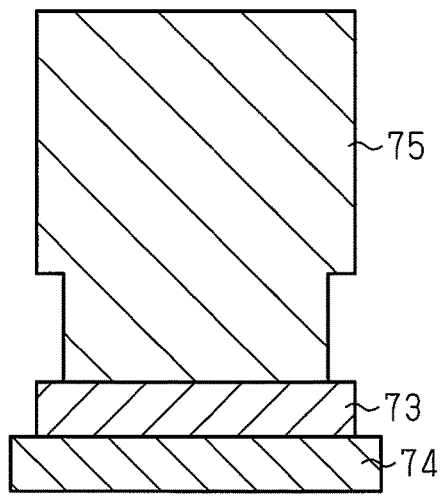
FIGS. 7A and 7B are schematic views illustrating a manufacturing method of a yoke housing in another example of the first embodiment.
Figure 7B:
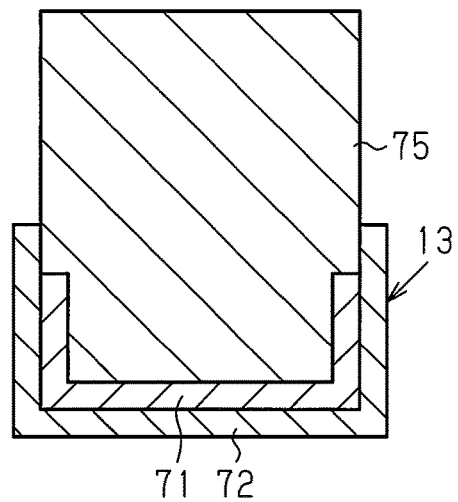

Further, for example, the configuration may be changed as shown in FIG. 6. The yoke housing 13 of this example has a general shape same as that of the first embodiment. A non-magnetic body part 71 is provided on a face axially opposed to the rotor 21. A magnetic body part 72 is provided on a buck face thereof. That is, the yoke housing 13 is made to have a partial two-layer structure. It is noted that the non-magnetic body part 71 of this example is provided in entire area on the inner side of the case 12 in a portion substantially corresponding to the non-magnetic body part 52 (the bottom part 13*a*) of the first embodiment. Moreover, the yoke housing 13 of this example (see FIG. 6) is formed by cold forging as schematically shown in FIGS. 7A and 7B. That is, as shown in FIG. 7A, a non-magnetic material 73 and a magnetic material 74 are placed on one another and pressed with a punch 75 to form a yoke housing 13 having a two-layer structure of the non-magnetic body part 71 and the magnetic body part 72 as shown in FIG. 7B.

In this way, the magnetic body part 72 is placed away from the rotor 21 by an amount of the non-magnetic body part 71 interposed between the magnetic body part 72 and the rotor 21. This configuration suppresses leakage flux leaked to the yoke housing 13 of the rotor 21. Thus, the volume of the non-magnetic body part 71 can be reduced, making it possible to reduce the material cost, for example, when the non-magnetic body part 71 is made of stainless steel (SUS). Moreover, for example, even when the thickness of the magnetic body part 72 is reduced, it is possible to ensure the strength of the relevant portion since the yoke housing 13 have a two-layer structure of the magnetic body part 72 and the non-magnetic body part 71.

In the first embodiment, the non-magnetic body part 52 is made of a non-magnetic metal (such as stainless steel (SUS) and aluminum). The non-magnetic body part is not limited to this, and may be made of a non-magnetic resin material.

In the first embodiment, the present invention is embodied in a brushless motor configured so that the number of poles of the rotor 21 is "8", and the number of the teeth 17a of the stator 16 is "12." The number of poles of the rotor 21 and the number of the teeth 17a of the stator 16 may be changed. For example, the present invention may be embodied in a brushless motor configured so that the number of poles of the rotor 21 is "10", and the number of the teeth 17a of the stator 16 is "12".

In the first embodiment, the rotor 21 includes the back-face auxiliary magnets 34 and 35. The rotor is not limited to this, and may not include the back-face auxiliary magnets 34 and 35.

In the first embodiment, the rotor 21 includes the inter-pole magnets 36 and 37. The rotor is not limited to this, and may not include the inter-pole magnets 36 and 37.

Hereafter, a second embodiment of the Lundell-type motor will be described.

Figure 9:
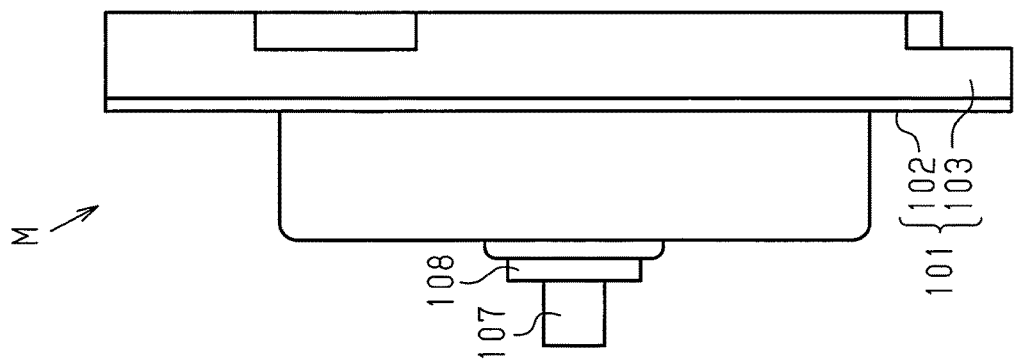
FIG. 9 is a side view of the brushless motor of FIG. 8.
Figure 8:
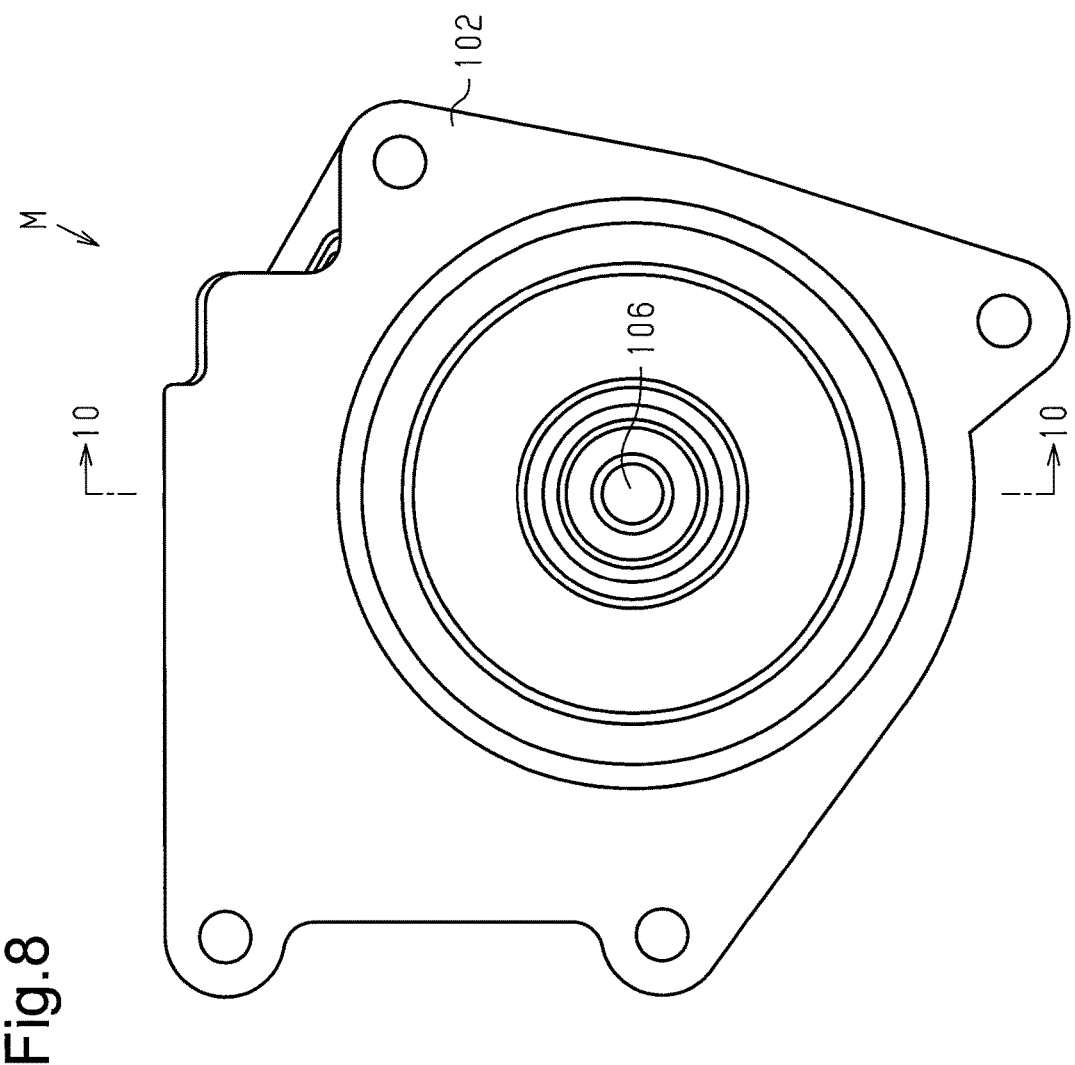
FIG. 8 is a front view seen from the axial direction of the brushless motor relating to a second embodiment of the present invention.
Figure 10:
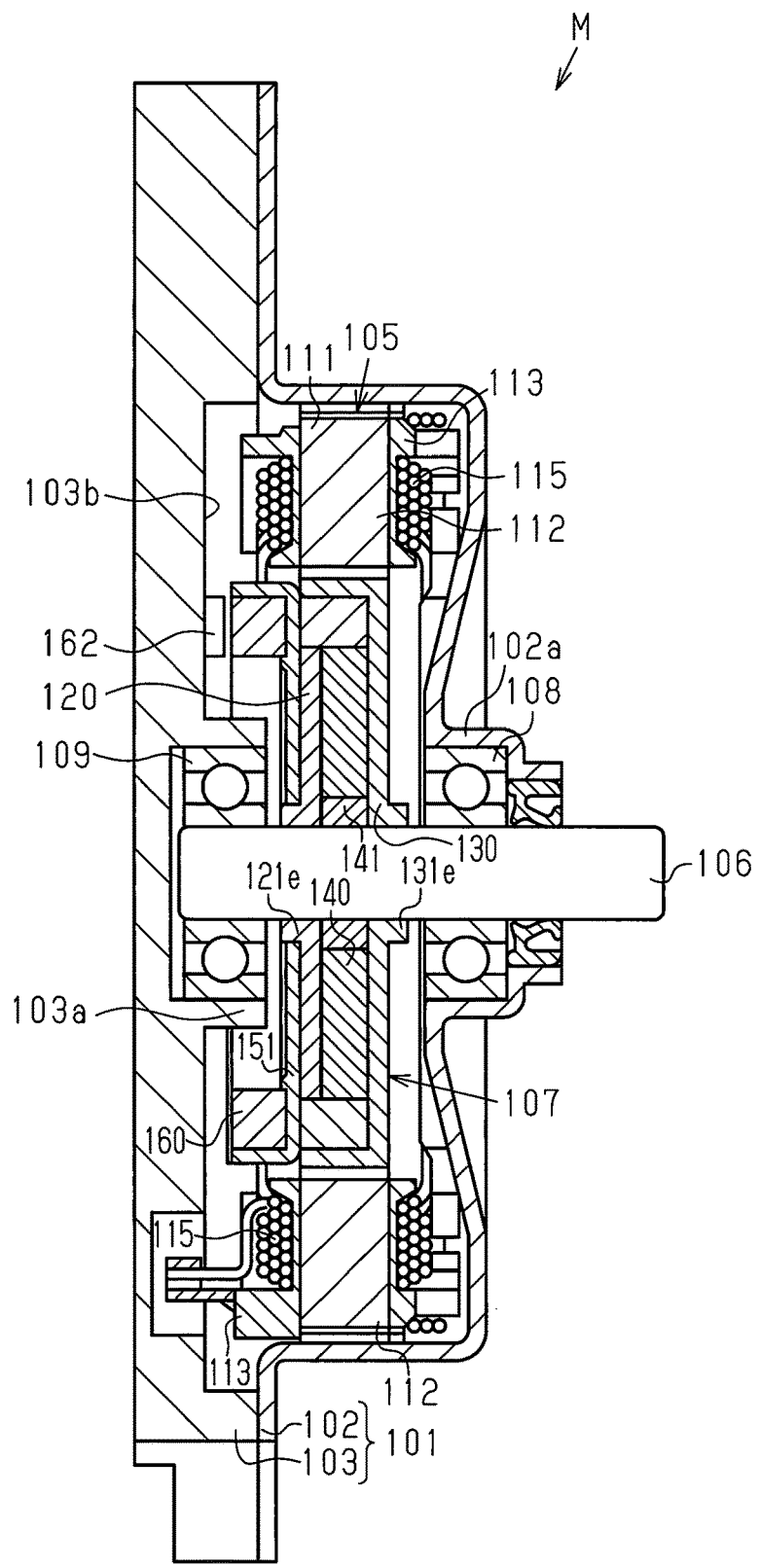
FIG. 10 is a sectional view taken along line 10-10 in FIG. 8.

As shown in FIGS. 8 to 10, a brushless motor M of the second embodiment, which is a Lundell-type motor, is a motor to be used for a position control device disposed in a vehicle engine room, particularly for a variable valve timing device to be linked to an engine.

As shown in FIGS. 8 to 11, the brushless motor M includes a motor case 101. The motor case 101 includes a tubular front housing 102 which is made of a magnetic body and is formed into a tubular shape having a cover part, and an end frame 103 which is made of aluminum (non-magnetic body) and closes an opening part of the tubular front housing 102.

The brushless motor M is configured such that a stator 105 is fixed to an inner peripheral surface of the tubular front housing 102, and a rotor 107 having a so-called Lundell-type structure, which is secured to the rotary shaft 106 and integrally rotates with the same rotary shaft 106, is arranged on the inner side of the stator 105. The rotary shaft 106, which is a shaft made of a non-magnetic stainless material, is supported to be rotatable with respect to the motor case 101 by a bearing 108 which is housed in and fixed to a bearing holding part 102a formed in the tubular front housing 102, and a bearing 109 which is housed in and fixed to a bearing holding part 103a formed in the end frame 103. It is noted that the bearing 109 is made of a non-magnetic body.

An axially inner-side face 103b (the end face close to the rotor 107) of the end frame 103 has a planar shape extending perpendicular to an axis of the rotary shaft 106. The bearing holding part 103a protrudes from the axially inner-side face 103b to the axially inward side (to the rotor 107). The bearing 109 is fixed to the bearing holding part 103a and arranged so as to protrude toward the rotor 107 from the axially inner-side face 103b.

The distal end part of the rotary shaft 106 protrudes from the tubular front housing 102. A valve timing, namely, a relative rotational phase of the cam shaft with respect to the crankshaft of the engine is appropriately changed by the rotational drive of the rotary shaft 106 according to driving conditions of a vehicle.

[Stator 105]

As shown in FIG. 10, the stator 105 is fixed with the inner peripheral surface of the tubular front housing 102. The stator 105 has a stator core 111 having a cylindrical shape. An outer peripheral surface of the stator core 111 is fixed to an inner-side face of the tubular front housing 102. A plurality of teeth 112 are arranged at an inner side of the stator core 111 at equal pitches in the circumferential direction. Each of the teeth 112 extends along an axial direction and extends toward the radially inner side (see FIG. 11). Each of the teeth 112 is a T-type tooth, and the inner peripheral surface thereof in the radial direction is an arc surface which is formed by extending an arc centering on the center-axis O of the rotary shaft 106 along the axial direction.

Figure 11:
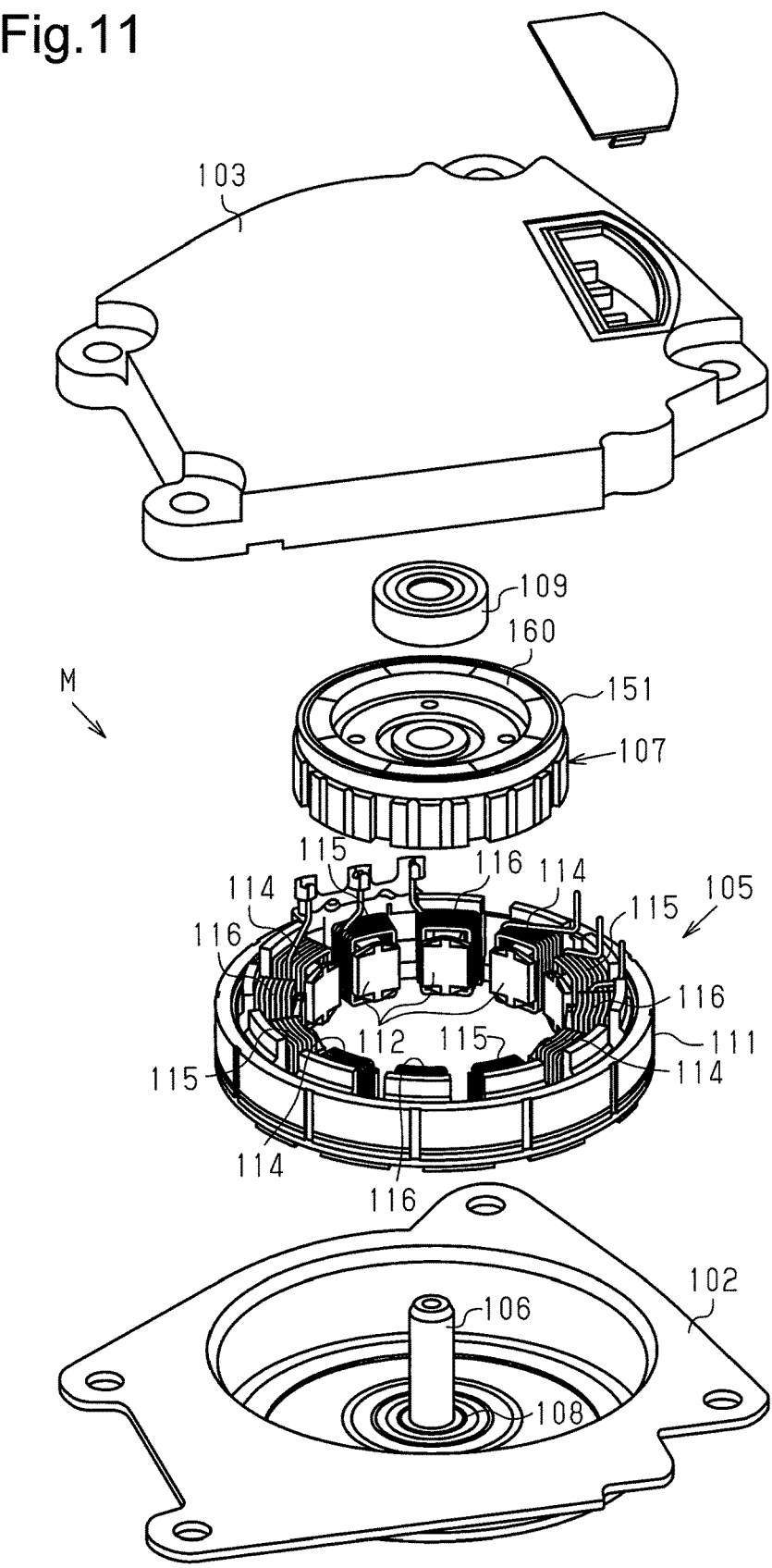
FIG. 11 is an exploded perspective view of the brushless motor of FIG. 10.

Three-phase windings (a V-phase winding 115 in FIG. 10) are respectively wound around each tooth 112 with an insulator 113 interposed therebetween. Specifically, as shown in FIG. 11, three-phase windings, that is, a U-phase winding 114, a V-phase winding 115, and a W-phase winding 116 are each wound around the twelve teeth 112 by a concentrated winding manner and arranged in that order in the circumferential direction. Further, a three-phase drive current is supplied to the phase windings 114, 115, and 116 to form a rotating magnetic field in the stator 105. The rotating magnetic field acts to rotate the rotor 107, which is secured to the rotary shaft 106 disposed inside the stator 105, in normal and reverse directions.

[Rotor 107]

As shown in FIGS. 10 and 11, the rotor 107 secured to the rotary shaft 106 is disposed inside the stator 105.

Figure 13:
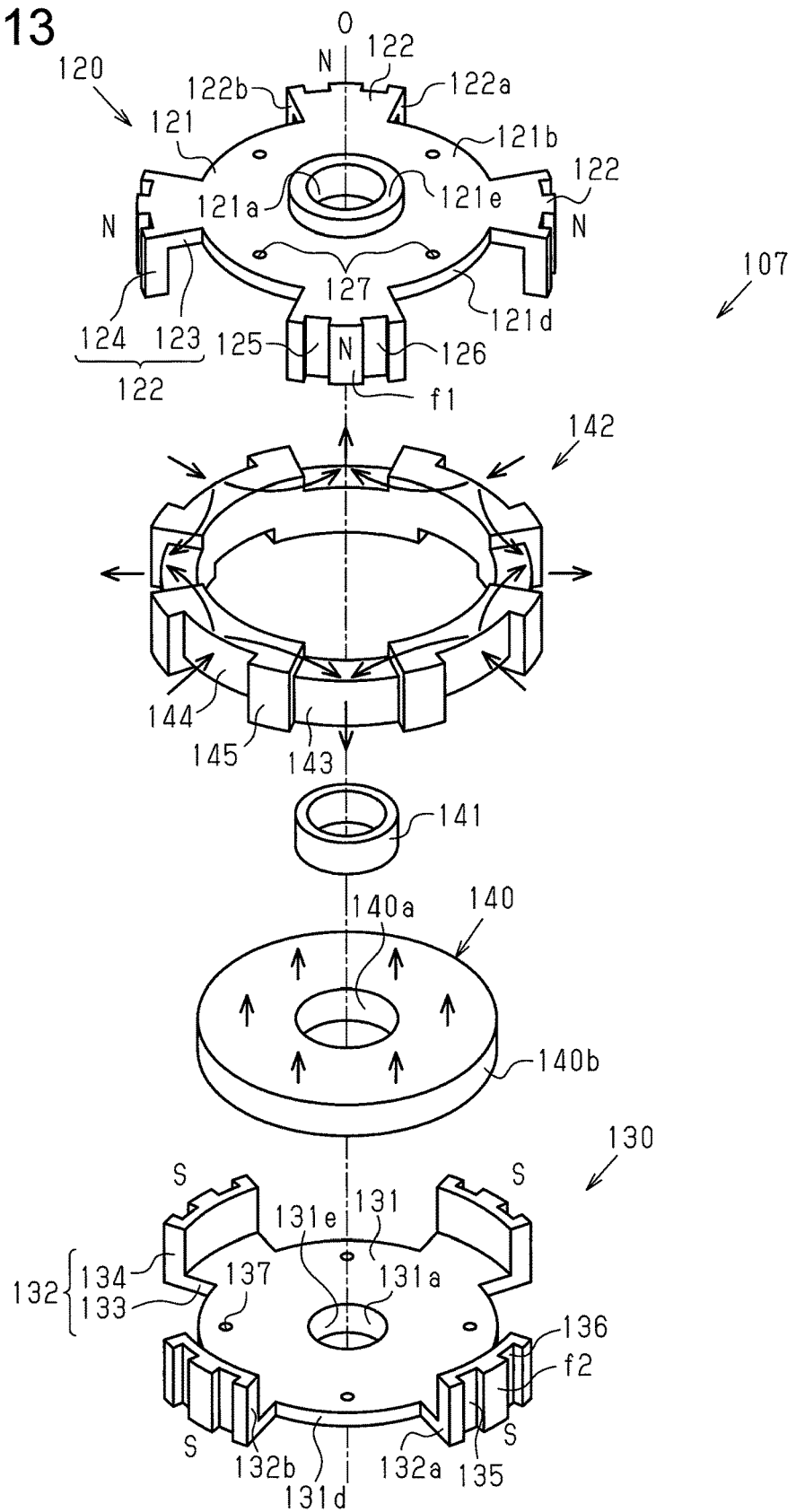
FIG. 13 is an exploded perspective view of the rotor of FIG. 12.

As shown in FIG. 13, the rotor 107 includes a first and second rotor cores 120 and 130 and a field magnet 140.

[First Rotor Core 120]

The first rotor core 120 is formed from electromagnetic steel sheet made of a soft magnetic material, and is disposed close to the end frame 103. The first rotor core 120 includes a first core base 121 having a disc shape. A through hole 121a is formed in a penetrating manner at its central position. A boss part 121e having a substantially cylindrical shape is formed in a protruding manner in the outer peripheral part of the through hole 121a located close to the end frame 103. In the second embodiment, the through hole 121a and the boss part 121e are simultaneously formed by burring process. It is noted that the outer diameter of the boss part 121e is formed to be smaller than the outer diameter of a bearing 109, which rotatably supports one side of the rotary shaft 106. That is, the outer diameter of the boss part 121e is formed to be smaller than the inner diameter of a bearing holding part 103a provided in the end frame 103 to house and fix the bearing 109.

The rotary shaft 106 is press-fitted into and inserted through the through hole 121a (the boss part 121e), and the first core base 121 is held by and fixed to the rotary shaft 106. At this time, forming the boss part 121e allows the first core base 121 to be firmly held by and fixed to the rotary shaft 106. Further, when the first core base 121 is held by and fixed to the rotary shaft 106, the boss part 121e is disposed so as to be separated in the axial direction from the bearing 109 which is housed in and fixed to the bearing holding part 103a (see FIG. 10).

On the outer peripheral surface 121d of the first core base 121, a plurality (four in the second embodiment) of first claw-shaped magnetic poles 122 are formed at equal intervals so as to protrude to the radially outer side and extend in the axial direction. Here, a portion of the first claw-shaped magnetic pole 122 that protrudes to the radially outer side from the outer peripheral surface 121d of the first core base 121 is referred to as a first base part 123, and a distal end portion which is bent in the axial direction is referred to as a first magnetic pole part 124.

Both circumferential end faces 122a and 122b of the first claw-shaped magnetic pole 122 including the first base part 123 and the first magnetic pole part 124 are each made to be a flat surface (which is not inclined with respect to the radial direction when seen from the axial direction) extending in the radial direction. Further, a circumferential angle of each first claw-shaped magnetic pole 122, that is, the angle between the above described both circumferential end faces 122a and 122b is set to be smaller than the angle of the gap between first claw-shaped magnetic poles 122 which are circumferentially adjacent to each other.

Further, the first magnetic pole part 124 is configured to have a radially outer-side face f1. The radially outer-side face f1 has an arc-like cross-section in a direction perpendicular to the axial direction. The arc-like cross-section extends along a circle centering on the center-axis O of the rotary shaft 106. The radially outer-side face f1 includes two grooves of a first auxiliary groove 125 and a second auxiliary groove 126. The first and second auxiliary grooves 125 and 126 are formed at positions which are respectively deviated by the same angle to both sides from the circumferential center of the radially outer-side face f1.

Moreover, the first and second auxiliary grooves 125 and 126 are each formed to have a C-shaped cross-section in a direction perpendicular to the axial direction. The first and second auxiliary grooves 125 and 126 each have a planar bottom face and side faces, which extend from both sides of the bottom face to the radially outer side in a direction perpendicular to the bottom face. Therefore, since the bottom face of each of the first and second auxiliary grooves 125 and 126 has a planar shape, the bottom face of each of the first and second auxiliary grooves 125 and 126 does not have an arc-like cross-section extending along a circle centering on the center-axis O of the rotary shaft 106 in a direction perpendicular to the axial direction. Accordingly, an entire portion of the radially outer-side face f1 including the bottom faces of the first and second auxiliary grooves 125 and 126 of the first magnetic pole part 124 does not have an arc-like cross-section extending along a circle centering on the center-axis O of the rotary shaft 106 in a direction perpendicular to the axial direction.

The first core base 121 includes a non-facing surface 121b, which has four positioning locking holes 127 formed in a penetrating manner and located at equal angular intervals on a circle centering on the center-axis O. The four positioning locking holes 127 are each formed at an intermediate position between adjacent first claw-shaped magnetic poles 122 formed in the first core base 121.

[Second Rotor Core 130]

As shown in FIG. 13, the second rotor core 130, which is made of the same material and has the same shape as the first rotor core 120, is disposed close to the tubular front housing 102. The second rotor core 130 includes a second core base 131 having a disc shape. A through hole 131a is formed in a penetrating manner at its central position.

As shown in FIG. 9, a boss part 131e having a substantially cylindrical shape is formed in a protruding manner in the outer peripheral part of the through hole 131a located close to the tubular front housing 102. In the second embodiment, the through hole 131a and the boss part 131e are simultaneously formed by burring process. It is noted that the outer diameter of the boss part 131e is formed to be smaller than the outer diameter of a bearing 108, which rotatably supports the other side of the rotary shaft 106. That is, the outer diameter of the boss part 131e is formed to be smaller than the inner diameter of a bearing holding part 102a provided in the tubular front housing 102 to house and fix the bearing 108.

The rotary shaft 106 is press-fitted into and inserted through the through hole 131a (boss part 131e), and the second core base 131 is held by and fixed to the rotary shaft 106. At this time, forming the boss part 131e allows the second core base 131 to be firmly held by and fixed to the rotary shaft 106. Further, when the second core base 131 is held by and fixed to the rotary shaft 106, the boss part 131e is disposed so as to be separated in the axial direction from the bearing 108 which is housed in and fixed to the bearing holding part 102a.

As shown in FIG. 13, on the outer peripheral surface 131d of the second core base 131, four of second claw-shaped magnetic poles 132 are formed at equal intervals so as to protrude to the radially outer side and extend in the axial direction. Here, a portion of the second claw-shaped magnetic pole 132 that protrudes to the radially outer side from the outer peripheral surface 131d of the second core base 131 is referred to as a second base part 133, and a distal end portion which is bent in the axial direction is referred to as a second magnetic pole part 134.

Circumferential end faces 132a and 132b of the second claw-shaped magnetic pole 132 including the second base part 133 and the second magnetic pole part 134 are each made to be a flat surface extending in the radial direction. Further, a circumferential angle of each second claw-shaped magnetic pole 132, that is, the angle between the above described both circumferential end faces 132a and 132b is set to be smaller than the angle of the gap between second claw-shaped magnetic poles 132 which are circumferentially adjacent to each other.

Further, the second magnetic pole part 134 is configured to have a radially outer-side face f2. The radially outer-side face f2 has an arc-like cross-section in a direction perpendicular to the axial direction. The arc-like cross-section extends along a circle centering on the center-axis O of the rotary shaft 106. The radially outer-side face f2 include two grooves of a first auxiliary groove 135 and a second auxiliary groove 136. The first and second auxiliary grooves 135 and 136 are formed at positions which are respectively deviated by the same angle to both sides from the circumferential center of the radially outer-side face f2.

Moreover, the first and second auxiliary grooves 135 and 136 are each formed to have a C-shaped cross-section in a direction perpendicular to the axial direction. The first and second auxiliary grooves 135 and 136 each have a planar bottom face and side faces, which extend from both sides of the bottom face to the radially outer side in a direction perpendicular to the bottom face. Therefore, since the bottom face of each of the first and second auxiliary grooves 135 and 136 has a planar shape, the bottom face of each of the first and second auxiliary grooves 135 and 136 does not have an arc-like cross-section extending along a circle centering on the center-axis O of the rotary shaft 106 in a direction perpendicular to the axial direction. Accordingly, an entire portion of the radially outer-side face f2 including the bottom faces of the first and second auxiliary grooves 135 and 136 of the second magnetic pole part 134 does not have an arc-like cross-section extending along a circle centering on the center-axis O of the rotary shaft 106 in a direction perpendicular to the axial direction.

The second core base 131 has four positioning locking holes 137 formed in a penetrating manner and located at equal angular intervals on a circle centering on the center-axis O. The four positioning locking holes 137 are each formed at an intermediate position between adjacent second claw-shaped magnetic poles 132 formed in the second core base 131.

Further, in the second rotor core 130, each second claw-shaped magnetic pole 132 is disposed between corresponding first claw-shaped magnetic poles 122. At this time, the second rotor core 130 is assembled to the first rotor core 120 in such a way that a field magnet 140 is disposed between the first core base 121 and the second core base 131 in the axial direction.

[Field Magnet 140]

As shown in FIG. 13, a field magnet 140 is a permanent magnet having a disc shape, and is formed with a through hole 140*a* in its central part. The field magnet 140 is configured such that a cylindrical sleeve 141 is inserted through the through hole 140*a* thereof. The sleeve 141 is made of a non-magnetic body, and is formed from the same stainless material as that of the rotary shaft 106 in the second embodiment. It is noted that the sleeve 141 is formed to have an axial length slightly larger than the axial thickness of the field magnet 140 in the second embodiment. Moreover, the sleeve 141 is formed such that its outer diameter is smaller than the inner diameter of the through hole 140*a* of the field magnet 140, and not smaller than the outer diameters of the boss parts 121*e* and 131*e*. Therefore, the inner diameter of the through hole 140*a* of the field magnet 140 is larger than the outer diameters of the boss parts 121*e* and 131*e*.

Moreover, the outer peripheral surface of the sleeve 141 and the inner peripheral surface of the through hole 140*a* of the field magnet 140 are adhered and fixed to each other with an adhesive made of a curable resin which is not permeable to magnetic flux. Specifically, after the rotary shaft 106 is inserted into the sleeve 141 without applying pressure, the sleeve 141 is inserted into the through hole 140*a* of the field magnet 140. At this time, insertion is performed with the inner peripheral surface of the through hole 140*a* being coated with an adhesive made of the curable resin. As a result, the adhesive will harden, thereby causing the field magnet 140 to be adhered and fixed to the sleeve 141.

The outer diameter of the field magnet 140 is set to correspond to the outer diameters of the first and second core bases 121 and 131. Therefore, the outer peripheral surface 140*b* of the field magnet 140 will become flush with the outer peripheral surfaces 121*d* and 131*d* of the first and second core bases 121 and 131.

The field magnet 140 is magnetized in the axial direction such that a portion close to the first rotor core 120 thereof becomes an N-pole (first magnetic pole) and a portion close to the second rotor core 130 thereof becomes an S-pole (second magnetic pole). Therefore, the field magnet 140 allows that the first claw-shaped magnetic pole 122 of the first rotor core 120 functions as an N-pole (first magnetic pole), and the second claw-shaped magnetic pole 132 of the second rotor core 130 functions as an S-pole (second magnetic pole).

Therefore, the rotor 107 of the second embodiment is a so-called Lundell-type rotor utilizing the field magnet 140. The rotor 107 is configured such that the first claw-shaped magnetic poles 122 which become N-poles and the second claw-shaped magnetic poles 132 which become S-poles are alternately disposed in the circumferential direction, and the number of magnetic poles is eight.

That is, the brushless motor M in the second embodiment is set such that the number of poles of the rotor 107 is 2×n (where n is a natural number), and the number of the teeth 112 of the stator 105 is 3×n, and specifically such that the number of poles of the rotor 107 is "8", and the number of teeth of the stator 105 is "12".

[Rectifying Magnet 142]

Moreover, the rotor 107 includes a rectifying magnet 142 which is fixed to the outer peripheral surface of the field magnet 140 by, for example, adhesion. The field magnet 140 is formed into an annular shape with a central hole. It is noted that the field magnet 140 and the rectifying magnet 142 are made of different materials. Specifically, the field magnet 140 is, for example, a sintered magnet having anisotropy and is made from, for example, a ferrite magnet, a samarium cobalt (Sm—Co) magnet, and a neodymium magnet. The rectifying magnet 142 is, for example, a bonded magnet (a plastic magnet, a rubber magnet, etc.) and is made from, for example, a ferrite magnet, a samarium iron nitrogen (Sm—Fe—N) system magnet, a samarium cobalt (Sm—Co) system magnet, and a neodymium magnet.

As shown in FIG. 13, the rectifying magnet 142 is a polar anisotropic magnet, which includes back-face magnet parts 143 and 144 and an inter-pole magnet part 145, and is magnetized such that leakage flux is suppressed by each of the back-face magnet parts 143 and 144 and the inter-pole magnet part 145.

Specifically, one back-face magnet part 143 is disposed between the inner peripheral surface of the first magnetic pole part 124 of the first claw-shaped magnetic pole 122 and the outer peripheral surface 131*d* of the second core base 131. Further, the back-face magnet part 143 is magnetized so as to have mainly the radial direction component such that a portion in contact with the inner peripheral surface of the first magnetic pole part 124 becomes an N-pole, which is the same polarity as that of the first magnetic pole part 124, and a portion in contact with the outer peripheral surface 131*d* of the second core base 131 becomes an S-pole, which is the same polarity as that of the second core base 131.

The other back-face magnet part 144 is disposed between the inner peripheral surface of the second magnetic pole part 134 of the second claw-shaped magnetic pole 132 and the outer peripheral surface 121*d* of the first core base 121. Further, the back-face magnet part 144 is magnetized so as to mainly have the radial component such that a part in contact with the inner peripheral surface of the second magnetic pole part 134 becomes an S-pole, which is the same polarity as that of the second magnetic pole part 134, and a part in contact with the outer peripheral surface 121*d* of the first core base 121 becomes an N-pole, which is the same polarity as that of the first core base 121.

The inter-pole magnet part 145 is disposed between the first claw-shaped magnetic pole 122 and the second claw-shaped magnetic pole 132 in the circumferential direction. The inter-pole magnet part 145 is magnetized in the circumferential direction so as to mainly have circumferential component such that a part thereof close to the first claw-shaped magnetic pole 122 becomes an N-pole, and a part thereof close to the second claw-shape magnetic pole 132 becomes an S-pole.

[Support Plate 151 and Sensor Magnet 160]

Figure 12:
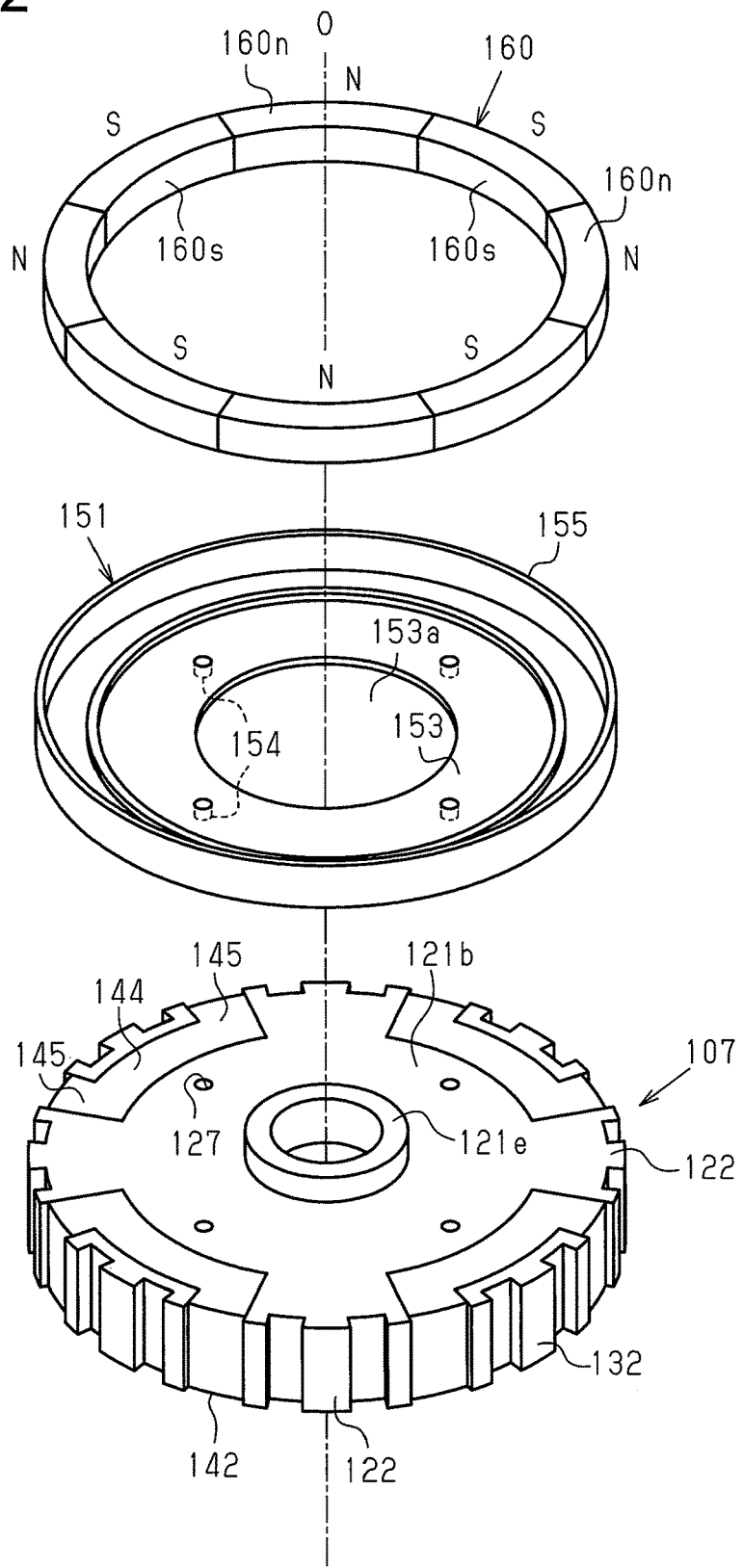
FIG. 12 is a perspective view of a rotor, a support plate, and a sensor magnet of FIG. 11.

As shown in FIGS. 10 and 12, a support plate 151 for holding a sensor magnet 160 is fixed to an end face of the rotor 107 that is close to the end frame 103 (the non-facing surface 121*b* of the first core base 121). It is noted that the support plate 151 is formed of a non-magnetic body (brass in the second embodiment).

As shown in FIG. 12, the support plate 151 includes a base part 153 having a disc shape. The base part 153 is formed in its central part with a through window 153*a* through which the rotary shaft 106 is passed. In the surface of the base part 153 on the first rotor core 120, four first locking protrusions 154 are formed in a protruding manner at equal angular intervals by press forming. Each of the first locking protrusions 154 is fitted to each of the positioning locking holes 127 formed in the non-facing surface 121b of the first core base 121. At this time, the base part 153 comes into contact with the non-facing surface 121b of the first core base 121 in the axial direction, and also into contact with a part of the rectifying magnet 142 (axial end faces of the back-face magnet part 144 and the inter-pole magnet part 145) in the axial direction.

In the outer peripheral edge part of the base part 153, a cylindrical wall 155 is formed to extend in the axial direction toward the opposite side of the rotor 107 (toward the end frame 103). The outer diameter of the cylindrical wall 155 is formed to be substantially equal to the outer diameter of the rotor 107.

As shown in FIGS. 11 and 12, the sensor magnet 160 having a ring shape is provided on the inner peripheral surface of the cylindrical wall 155. It is noted that the sensor magnet 160 has its radially outer-side face fixed with an adhesive to the inner peripheral surface of the cylindrical wall 155. At this time, the sensor magnet 160 is fixed to the support plate 151 such that a center axis of the sensor magnet 160 having a ring shape corresponds to the center-axis O of the rotary shaft 106. In this way, the sensor magnet 160 is configured to be integrally rotatable with the rotary shaft 106 and the rotor 107 at an axially sideward position of the rotor 107.

As shown in FIG. 12, the sensor magnet 160 is magnetized such that N-poles and S-poles are alternately present at equal angular intervals in the circumferential direction. Specifically, the magnetic pole of part of the sensor magnet 160 that is located close to the first rotor core 120 is magnetized such that a portion thereof axially facing the first claw-shaped magnetic pole 122 becomes an N-pole, and a portion thereof axially facing the second claw-shaped magnetic pole 132 becomes an S-pole. That is, the magnetic poles of the part of the ring shaped sensor magnet 160 that is located close to the first rotor core 120 are magnetized such that an N-pole portion 160n which is magnetized into an N-pole and an S-pole portion 160s which is magnetized into an S-pole respectively correspond to a magnetic pole of the first claw-shaped magnetic pole 122 and a magnetic pole of the second claw-shaped magnetic pole 132.

As shown in FIG. 10, the sensor magnet 160 is disposed on the radially outer side of the bearing holding part 103a which protrudes toward the rotor 107 (toward the end face on the rotor 107) from the axially inner-side face 103b of the end frame 103. In other words, the bearing holding part 103a is configured such that a part thereof is disposed on the radially inner side of the ring-shaped sensor magnet 160. It is noted that the bearing holding part 103a is axially opposed to the base part 153 of the support plate 151, and the bearing holding part 103a of the end frame 103 is axially opposed to the sensor magnet 160.

[Magnetic Sensor 162]

A magnetic sensor 162 such as a hall IC, which is opposed to the sensor magnet 160 at a fixed interval in the axial direction, is supported on the axially inner-side face 103b of the end frame 103. It is noted that the magnetic sensor 162 may be directly fixed to the end frame 103, or may be indirectly held by the end frame 103 via a holding member (not shown).

When the rotor 107 rotates, the sensor magnet 160 is rotated such that the N-pole portion 160n magnetized into an N-pole and the S-pole portion 160s magnetized into an S-pole alternately pass in front of the magnetic sensor 162. In association with this rotation, the magnetic sensor 162 detects that the N-pole portion 160n and the S-pole portion 160s of the sensor magnet 160 alternately pass through.

The magnetic sensor 162 outputs a detection signal to a control circuit which is not shown. The control circuit calculates the rotational angle (rotational position) of the rotor 107 and the number of revolutions based on the detection signal from the magnetic sensor 162. Then, the control circuit utilizes the calculated rotational angle (rotational position) and the number of revolutions to control the driving of the brushless motor M.

Next, actions of the second embodiment will be described.

When a three-phase drive current is supplied to windings of each phase 114, 115, and 116 of the stator core 111, thereby forming a rotating magnetic field in the stator 105, the rotor 107 which is secured to the rotary shaft 106 disposed on the inner side of the stator 105 rotates based on the rotating magnetic field. At this time, the support plate 151 and the sensor magnet 160 rotate as well centering on the rotary shaft 106.

The motor M of the second embodiment is configured such that the end frame 103, which forms the motor case 101 is placed axially close to the rotor 107 and the sensor magnet 160 arranged inside the motor case 101. Moreover, the rotor 107 is magnetized by the field magnet 140 such that the first claw-shaped magnetic pole 122 of the first rotor core 120 becomes an N-pole and the second claw-shaped magnetic pole 132 of the second rotor core 130 becomes an S-pole.

Here, since the end frame 103 is made of aluminum which is a non-magnetic body, the magnetic flux of the field magnet 140 of the rotor 107 is prevented from leaking to the end frame 103. In particular, since, in the end frame 103 of the second embodiment, the bearing holding part 103a is formed to protrude toward the rotor 107 in the axial direction, an air gap defined toward the rotor 107 from the bearing holding part 103a (clearance between the end frame 103 and the rotor 107 in the axial direction) is minimized. However, since the bearing holding part 103a is also a non-magnetic body, the magnetic flux of the field magnet 140 is unlikely to leak to the bearing holding part 103a. Since the leakage of magnetic flux to the end frame 103 is suppressed, the effect of leakage flux affected to the magnetic sensor 162 supported on the end frame 103 is suppressed to a low level. Further, since the leakage of magnetic flux to the end frame 103 is suppressed, it is possible to increase the output of the brushless motor M.

Moreover, the boss parts 121e and 131e of the first and second core bases 121 and 131 are disposed to be separated in the axial direction respectively from the bearings 108 and 109 which are housed in and fixed to the bearing holding parts 102a and 103a. Further, the outer diameters of the boss parts 121e and 131e are set to be smaller than those of the bearings 108 and 109. As a result, the magnetic flux of the field magnet 140 is unlikely leak to the motor case 101 via the bearings 108 and 109 and the bearing holding parts 102a and 103a. This makes it possible to further increase the output of the brushless motor M. Further, as a result of the suppression of the leakage flux to the end frame 103, it becomes possible to suppress the effect of the leakage flux affected to the magnetic sensor 162.

Furthermore, the outer diameter of the sleeve 141 formed of a non-magnetic body is set to be not smaller than those of the boss parts 121e and 131e formed in the first and second core bases 121 and 131, respectively. As a result, the magnetic flux of the field magnet 140 is unlikely to leak to the motor case 101 through the boss parts 121e and 131e, thus contributing to further increasing the output of the brushless motor M, and also allowing further suppressing the effect of leakage flux affected to the magnetic sensor 162.

Next, characteristic advantages of the second embodiment will be described.

(5) At least part of an end part in the axial direction of the motor case 101 is made of a non-magnetic body. Therefore, leakage flux which leaks in the axial direction from the field magnet 140 of the rotor 107 through the first rotor core 120 and the second rotor core 130 will be decreased.

(6) Since the end frame 103 is made of a non-magnetic body, leakage of the magnetic flux of the field magnet 140 of the rotor 107 to the end frame 103 will be suppressed even when the clearance in the axial direction between the end frame 103 and the rotor 107 is reduced. As a result, it becomes possible to reduce the size of the motor M in the axial direction while suppressing the leakage of magnetic flux in the axial direction from the rotor 107 to the magnetic sensor 162.

(7) Since the sensor magnet 160 is fixed to an axial end face of the rotor 107 (first rotor core 120) via the support plate 151, it becomes possible to reduce an axial clearance between the rotor 107 and the sensor magnet 160, thereby contributing to further reducing the thickness of the motor M.

(8) The sensor magnet 160 has an annular shape centering on the rotary shaft 106. The bearing holding part 103a is disposed on the radially inner side of the sensor magnet 160. Accordingly, it becomes possible to reduce the axial clearance between the end frame 103 and the sensor magnet 160, thereby contributing to further reducing the thickness of the motor M.

(9) Since the bearing 109 and the rotary shaft 106 are made of a non-magnetic body, it becomes possible to further suppress the leakage of magnetic flux from the rotor 107 to the end frame 103.

(10) Since the end frame 103 is made of aluminum, it is possible to ensure the rigidity of the end frame 103 while allowing the suppression of leakage of magnetic flux from the rotor 107 to the end frame 103 and reducing the thickness of the motor M in the axial direction.

It is noted that the second embodiments may be modified as described below.

In the second embodiment, the bearing 109 and the rotary shaft 106 are each made of a non-magnetic body. The bearing and the rotary shaft are not limited to these, and may be made of a magnetic body.

In the second embodiment, the non-magnetic end frame 103 is made of aluminum. The non-magnetic end frame only requires a non-magnetic body, and may be made of, for example, a stainless material and a resin, other than aluminum.

In the second embodiment, the support plate 151 and the sensor magnet 160 are supported on the rotor 107. The sensor magnet only requires to be integrally rotatable with the rotary shaft 106. For example, the support plate 151 may be fixed (for example, press-fitted) to the rotary shaft 106 so as to be axially spaced apart from the rotor 107 (first rotor core 120).

In the second embodiment, the sleeve 141 and the field magnet 140 are adhered and fixed to each other with an adhesive made of a curable resin which is not permeable to magnetic flux. The sleeve 141 and the field magnet 140 may be fixed to each other with an adhesive permeable to magnetic flux.

In the second embodiment, the non-magnetic sleeve 141 is made of a stainless material. The non-magnetic sleeve is not limited to stainless materials and may be made of any non-magnetic body, for example, an aluminum material and a resin.

In the second embodiment, the brushless motor M is used as the driving source for a variable valve timing device. The brushless motor may be used, as a matter of course, as a driving source for other devices (for example, a throttle valve control device).

Hereafter, a third embodiment of brushless motor will be described with reference to FIGS. 14 to 16.

Figure 14:
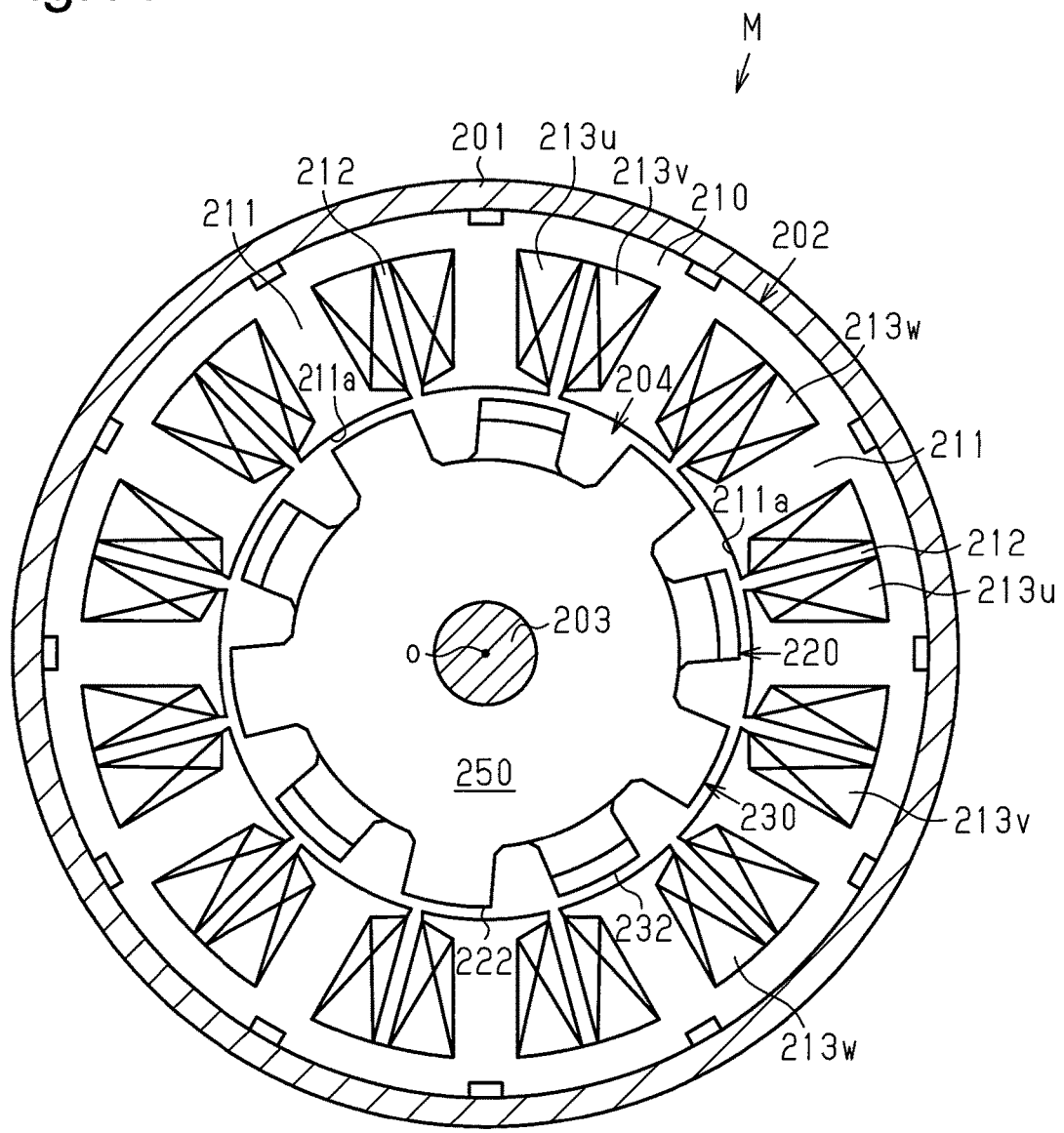
FIG. 14 is a partial sectional view of a brushless motor relating to a third embodiment of the present invention.

As shown in FIG. 14, a brushless motor M as a motor is configured such that a stator 202 is fixed on the inner peripheral surface of a motor housing 201, and on the inner side of the stator 202, a rotor 204 having a so-called Lundell-type structure is disposed. The rotor 204 is fixed to a rotary shaft 203 and integrally rotates with the rotary shaft 203. The rotary shaft 203, which is a shaft made of a non-magnetic stainless steel, is supported by a bearing, which is not shown and provided in the motor housing 201, so as to be rotatable with respect to the motor housing 201.

The stator 202 includes a stator core 210 having a cylindrical shape. The outer peripheral surface of the stator core 210 is fixed to the inner peripheral surface of the motor housing 201. On the inner side of the stator core 210, a plurality of teeth 211, which are formed along an axial direction and disposed at equal pitches in the circumferential direction, are each formed to extend to the radially inner side. Each of the teeth 211 is a T-type tooth. The inner peripheral surface 211a on the radially inner side is an arc surface which is formed by extending an arc extending along a circle centering on the center-axis O of the rotary shaft 203 in the axial direction.

A slot 212 is formed between teeth 211 in the circumferential direction. In the third embodiment, the number of the teeth 211 is twelve, and the number of the slots 212 is twelve same as that of the teeth 211. Three-phase windings, that is, a U-phase winding 213u, a V-phase winding 213v, and a W-phase winding 213w are each wound around the twelve teeth 211 in a concentrated manner in that order in the circumferential direction. Those windings are disposed in the slots 212, respectively.

Then, a three-phase power supply voltage is applied to each phase windings 213u, 213v, and 213w to generate a rotating magnetic field in the stator 202, thereby rotating the rotor 204 which is secured to the rotary shaft 203 disposed on the inner side of the stator 202.

Figure 15:
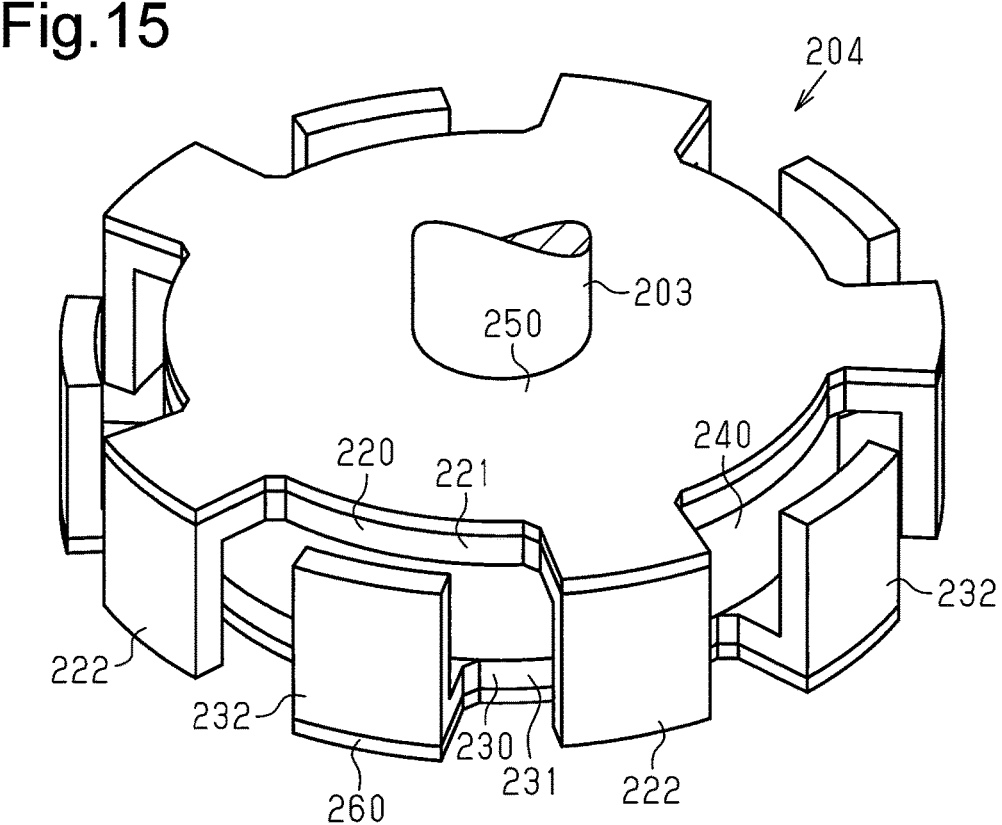
FIG. 15 is a perspective view of the rotor of FIG. 14.
Figure 16:
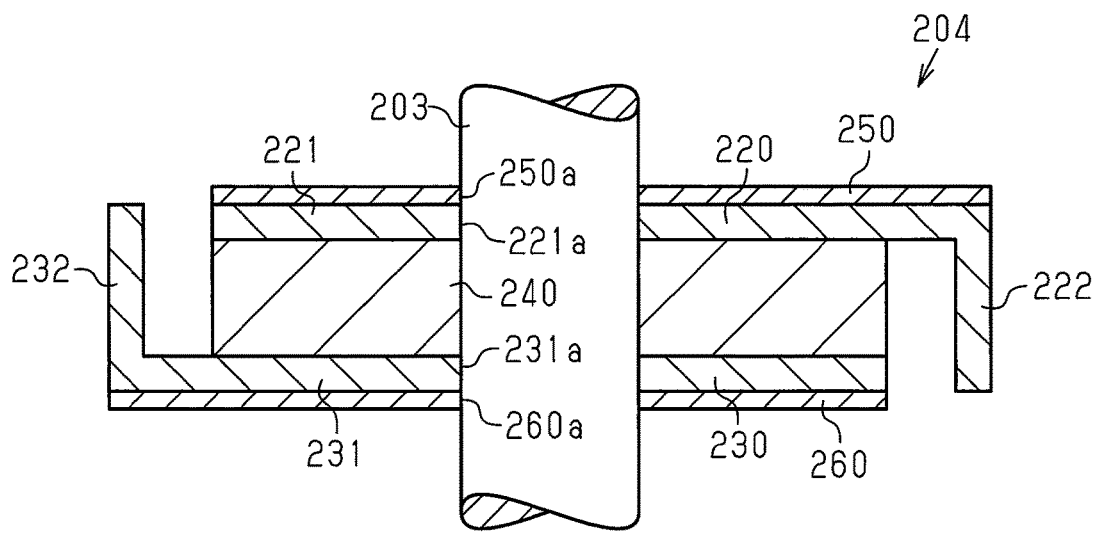
FIG. 16 is a partial sectional view of the rotor of FIG. 15.

As shown in FIGS. 15 and 16, the rotor 204 includes a first and second rotor cores 220 and 230, a field magnet 240, and magnetic adjustment members 250 and 260.

As shown in FIG. 16, the first rotor core 220 is made of a magnetic body and includes a first core base 221, which has a substantially disc shape and is formed with a central hole 221a into which the rotary shaft 203 is press-fitted. In the outer peripheral part of the first core base 221, a plurality (five in the third embodiment) of first claw-shaped magnetic poles 222 are formed at equal intervals so as to protrude to the radially outer side and extend in the axial direction.

The second rotor core 230, which is made of the same material and has the same shape as the first rotor core 220, includes a second core base 231, which has a substantially disc shape and is formed with a central hole 231a into which the rotary shaft 203 is press-fitted. In the outer peripheral part of the second core base 231, a plurality (five in the third embodiment) of second claw-shaped magnetic poles 232 are formed at equal intervals so as to protrude to the radially outer side and extend in the axial direction.

Further, the first and second rotor cores 220 and 230 are fixed with the rotary shaft 203 by press-fitting their central holes 221a and 231a to the rotary shaft 203. In this case, the second rotor core 230 is assembled to the first rotor core 220 in such a way that each of the second claw-shaped magnetic poles 232 is disposed between the first claw-shaped magnetic poles 222 adjacent to each other in the circumferential direction. A field magnet 240 is disposed (sandwiched) between the first core base 221 and the second core base 231 in the axial direction.

As shown in FIG. 16, the field magnet 240, which is a permanent magnet having a substantially disc shape and a central hole, is magnetized in the axial direction such that the first claw-shaped magnetic pole 222 functions as a first magnetic pole (an N-pole in the third embodiment) and the second claw-shaped magnetic pole 232 functions as a second magnetic pole (an S-pole in the third embodiment). That is, the rotor 204 of the third embodiment is a rotor having a so-called Lundell-type structure. The rotor 204 is configured such that five of the first claw-shaped magnetic poles 222 which each becomes an N-pole and five of the second claw-shaped magnetic poles 232 which each becomes an S-pole are alternately disposed in the circumferential direction, and the number of poles is ten (the number of pole pairs is five). That is, the third embodiment is a brushless motor M which is set such that the number of magnetic poles (number of poles) of the rotor 204 is "10" and the number of the teeth 211 (slots 212) of the stator 202 is "12".

Further, in the first and second rotor cores 220 and 230 of the third embodiment, magnetic adjustment members 250 and 260 for adjusting the thickness in the axial direction are provided in a laminated manner in the axial direction.

Specifically, the magnetic adjustment members 250 and 260 of the third embodiment are made of the same material (a magnetic material) as that of the first and second rotor cores 220 and 230, and are formed into a plate shape. Moreover, the magnetic adjustment members 250 and 260 are formed to have a thickness smaller than those of the first and second rotor cores 220 and 230 (specifically, the thickness of the first and second core bases 221 and 231).

Further, the magnetic adjustment member 250 is provided in the first rotor core 220 so as to interpose the first rotor core 220 (specifically, the first core base 221) between itself and the field magnet 240. The magnetic adjustment member 260 is provided in the second rotor core 230 so as to interpose the second rotor core 230 (specifically, the second core base 231) between itself and the field magnet 240. Moreover, the magnetic adjustment members 250 and 260 are formed into a shape that is same as the shape of an end face of the first and second rotor cores 220 and 230 that is in contact with the magnetic adjustment members 250 and 260 (that is, each of the first and second core bases 221 and 231 and each portion of the first and second claw-shaped magnetic poles 222 and 232 protruding to the radially outer side).

Further, the magnetic adjustment members 250 and 260 are fixed by adhesion to the first and second rotor cores 220 and 230, respectively. Furthermore, the magnetic adjustment members 250 and 260 have central holes 250a and 260a, respectively, and the rotary shaft 203 is press-fitted into the central holes 250a and 260a so that the magnetic adjustment members 250 and 260 are fixed to the rotary shaft 203.

Figure 17:
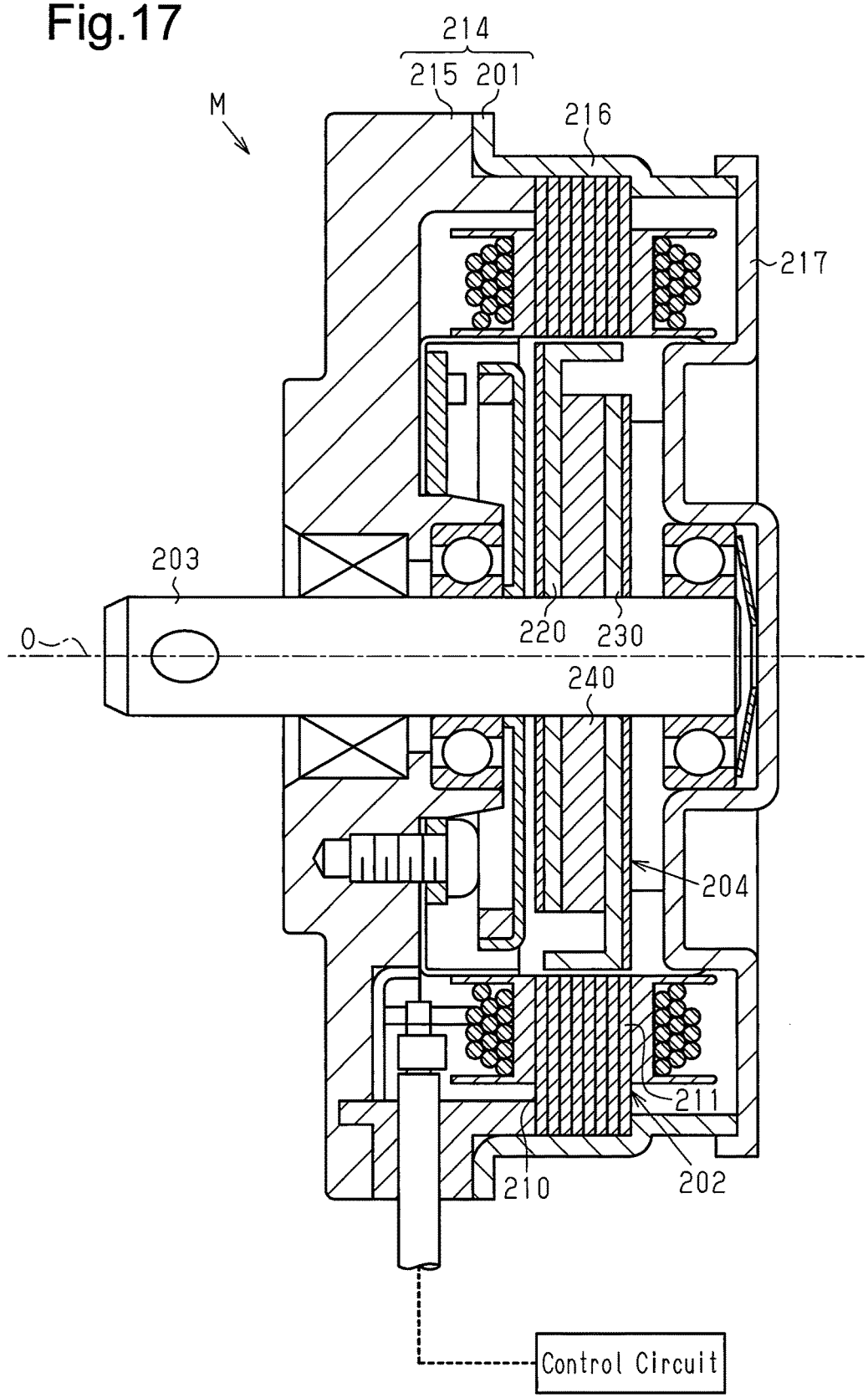
FIG. 17 is a sectional view of the brushless motor of FIG. 14.

FIG. 17 shows a state in which the brushless motor M of the third embodiment is housed in a case 214. The case 214 includes a motor housing 201, and an end plate serving as a cover part which is made from a non-magnetic resin part, and closes an opening part of the motor housing 201. The motor housing 201 includes a magnetic body part 216 and a non-magnetic body part 217. Since the case 214 is configured in the same manner as the case 12 of the first embodiment, detailed description thereof will be omitted.

Next, actions of the brushless motor M which is configured as described above are described.

When three-phase power supply voltage is applied to each phase windings 213u, 213v, and 213w of the stator core 210 to generate a rotating magnetic field in the stator 202, the rotor 204 which is secured to the rotary shaft 203 disposed inside the stator 202 is driven to rotate based on the rotating magnetic field.

Next, characteristic advantages of the third embodiment will be described below.

(11) Since the motor housing 201 includes a magnetic body part 216 and a non-magnetic body part 217, it becomes possible to configure such that the magnetic body part 216 constitutes a part of magnetic path of the stator 202 while the non-magnetic body part 217 suppresses leakage flux leaked to the motor housing 201 of the rotor 204. Thus, it is possible to increase the thickness of the rotor 204, thereby increasing the output of the brushless motor M.

(12) In the first and second rotor cores 220 and 230, magnetic adjustment members 250 and 260 for adjusting the thickness in the axial direction are provided in the laminated manner in the axial direction. Accordingly, for example, simply by changing the thickness and the number of the magnetic adjustment members 250 and 260, it is possible to easily change details and the like of the motor M to adjust the power output characteristics of the brushless motor M to a desired value.

(13) Since the magnetic adjustment members 250 and 260 are formed to have a thickness smaller than those of the first and second rotor cores 220 and 230, it becomes possible to finely adjust power output characteristics.

(14) The magnetic adjustment members 250 and 260 are provided so as to respectively interpose the first and second rotor cores 220 and 230 between themselves and the field magnet 240. Accordingly, it becomes possible to assemble the field magnet 240 and the first and second rotor cores 220 and 230 in advance, and thereafter, the magnetic adjustment members 250 and 260 can be appropriately modified without releasing the assembled state (contact state), for example. That is, it is possible to produce a part including the field magnet 240 and the first and second rotor cores 220 and 230 assembled to each other in advance as a standard part, and thereafter, the thickness and the number of the magnetic adjustment members 250 and 260 can be changed for each detail to adjust the power output characteristics to a desired value.

(15) The magnetic adjustment members 250 and 260 are each formed into a shape that is the same as the shape of an end face of the first and second rotor cores 220 and 230 that is in contact with the magnetic adjustment members 250 and 260. Accordingly, each portion that corresponds to the shape of the end face of the first and second rotor cores 220 and 230 has a uniform thickness and a simple shape.

(16) The magnetic adjustment members 250 and 260 are fixed by adhesion to the first and second rotor cores 220 and 230, respectively. Accordingly, it is possible to suppress falling-off of the magnetic adjustment members 250 and 260 compared with a case where the rotary shaft 203 is simply press-fitted to each of the central holes 250a and 260a of the magnetic adjustment members 250 and 260 so that the magnetic adjustment members 250 and 260 are indirectly fixed to the first and second rotor cores 220 and 230, respectively.

The third embodiment may be changed as described below.

Figure 18:
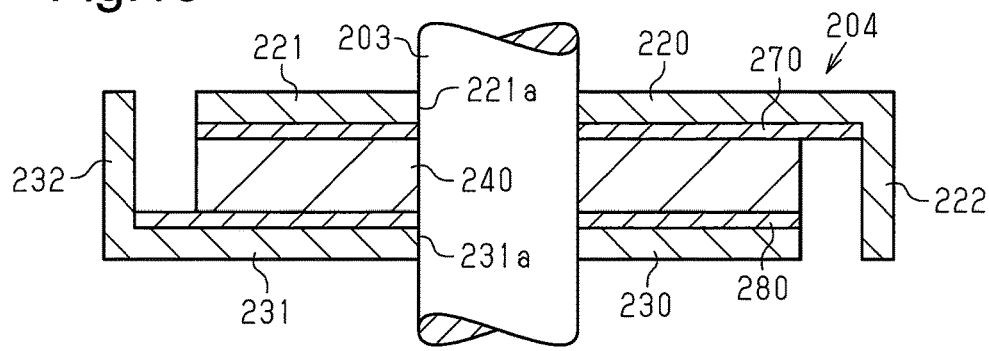
FIG. 18 is a partial sectional view of a rotor of another example of the third embodiment.

In the third embodiment, the magnetic adjustment members 250 and 260 are provided so that the first and second rotor cores 220 and 230 are interposed between the magnetic adjustment members 250 and 260 and the field magnet 240, respectively. The magnetic adjustment members are not limited to these configurations. As shown in FIG. 18, the rotor 204 may be configured such that magnetic adjustment members 270 and 280 are provided so as to be interposed between the field magnet 240 and the first and second rotor cores 220 and 230, respectively. Such a configuration makes it possible, for example, to firmly hold the magnetic adjustment members 270 and 280. It is noted that in this example, it is also possible to adjust the power output characteristics by changing the axial thickness of the field magnet 240 depending on the thickness of the magnetic adjustment members 270 and 280 so as not to change the axial thickness of the entire rotor 204.

In the third embodiment, the rotor 204 includes one first rotor core 220 and one second rotor core 230. The rotor 204 is not limited to this. The rotor may be configured to include a plurality of the first rotor cores 220 and a plurality of the second rotor cores 230 which are stacked in the axial direction.

Figure 19:
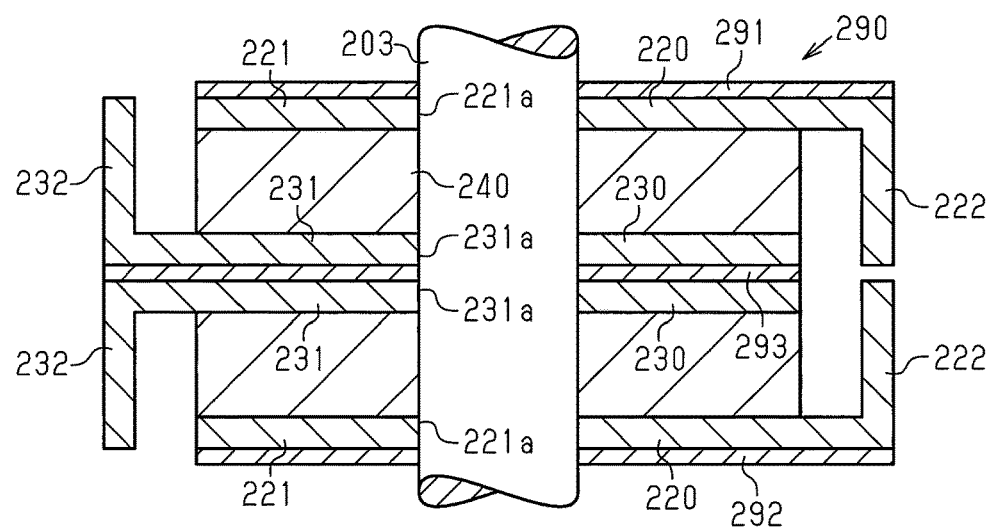
FIG. 19 is a partial sectional view of a rotor of a further example of the third embodiment.

For example, the configuration may be changed as shown in FIG. 19. A rotor 290 of this example includes two first rotor cores 220 and two second rotor cores 230. In this example, magnetic adjustment members 291 to 293 are provided on both axial end faces (on each of the first rotor cores 220) of the rotor 290 and in an axially intermediate portion (between the second rotor cores 230) of the rotor 290.

Figure 20:
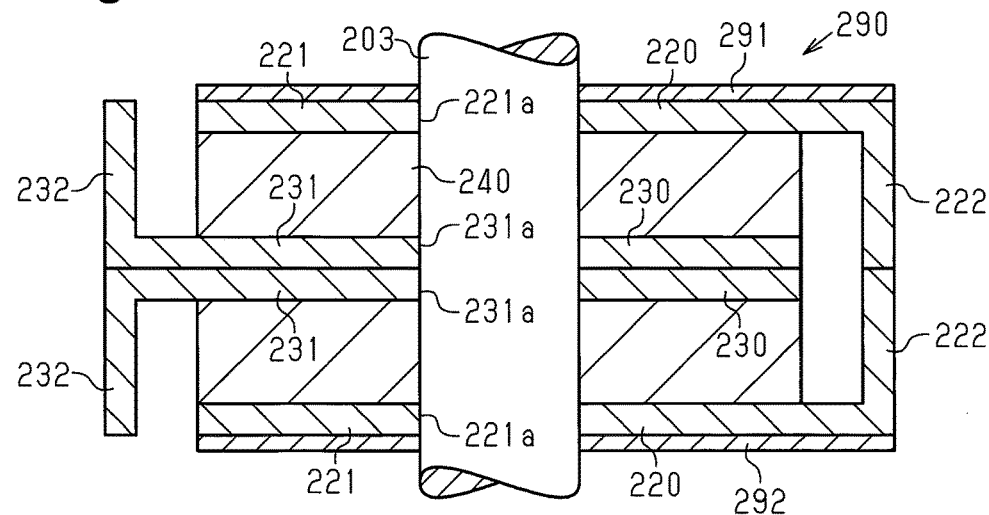
FIG. 20 is a partial sectional view of a rotor of a further example of the third embodiment.

Moreover, for example, the configuration may be changed as shown in FIG. 20. A rotor 290 of this example includes two first rotor cores 220 and two second rotor cores 230. In this example, magnetic adjustment members 291 and 292 are respectively provided on both axial end faces of the rotor 290 (on each of the first rotor cores 220).

In this way, it is also possible to easily change details and the like of the motor M to adjust the power output characteristics of the brushless motor M to a desired value. It is noted that the second rotor cores 230 arranged at the axially intermediate portion of the rotor 290 have the same polarity with each other. Accordingly, magnetic flux is not likely to leak in the axial direction (compared with portions located at both axial ends of the rotor 290) and is more likely to proceed in the radial direction. Thus, in this configuration, magnetic saturation is less likely to affect on the characteristics of the motor.

In the third embodiment, the magnetic adjustment members 250 and 260 are each formed to have a thickness smaller than those of the first and second rotor cores 220 and 230 (specifically, the thicknesses of the first and second core bases 221 and 231). The configurations of the magnetic adjustment members 250 and 260 are not limited to those. The magnetic adjustment members 250 and 260 may each have a thickness that are the same as or larger than those of the first and second rotor cores 220 and 230.

Further, although not particularly mentioned in the third embodiment, the rotor may be manufactured in such a way that plural kinds of magnetic adjustment members are prepared, and a right kind thereof can be determined according to the details of the motor to provide the selected magnetic adjustment members to be applied to the first and second rotor cores 220 and 230. In this case, the magnetic adjustment members to be prepared in advance may simply have different thicknesses or may be made of different materials (of those having different saturation magnetic flux densities, such as a powder magnetic core, amorphous magnetic alloy, electromagnetic steel sheet, electromagnetic soft iron, Permalloy, and Permendur).

In this way, it is possible to easily and finely adjust the power output characteristics of the brushless motor M to a desired value. In particular, using a magnetic adjustment member of different material makes it possible, for example, to change and adjust the power output characteristics by a great degree without reducing the thickness of the magnetic adjustment member resulting in the change in the thickness of the entire rotor.

Moreover, of course, the rotor may be manufactured in such a way that a large number of magnetic adjustment members each having small thicknesses are prepared, the number thereof is determined according to details of the moor, and the magnetic adjustment members having numbers determined as such can be applied to the first and second rotor cores 220 and 230.

In the third embodiment, the magnetic adjustment members 250 and 260 are each formed into a shape that is the same as the shape of an end face of the first and second rotor cores 220 and 230 that is in contact with the magnetic adjustment members 250 and 260. The magnetic adjustment members 250 and 260 are not limited to those configurations. The magnetic adjustment members 250 and 260 may be changed to have a shape different from that of the end face of the first and second rotor cores 220 and 230 that is in contact with the magnetic adjustment members 250 and 260.

In the third embodiment, the magnetic adjustment members 250 and 260 are fixed by adhesion to the first and second rotor cores 220 and 230, respectively. The magnetic adjustment members are not limited to those configurations, and for example, they may be configured to be fixed by swaging or welding. Moreover, the magnetic adjustment members may be indirectly fixed (abutted) to the first and second rotor cores 220 and 230, respectively, such that the rotary shaft 203 is press-fitted into each of the central holes 250*a* and 260*a* of the magnetic adjustment members 250 and 260.

In the third embodiment, the present invention is embodied as a brushless motor M which is set such that the number of poles of the rotor 204 is "10" and the number of the teeth 211 of the stator 202 is "12." The number of poles of the rotor 204 and the number of the teeth 211 of the stator 202 may be changed. For example, the present invention may be embodied as a brushless motor which is set such that the number of poles of the rotor 204 is "8", and the number of the teeth 211 of the stator 202 is "12".

In the third embodiment, a back-face magnet may be provided in the radially inner side (back face) of each of the first and second claw-shaped magnetic poles 222 and 232 for suppressing the leakage flux of the relevant portions.

Further, in the third embodiment, an inter-pole magnet may be provided between the first and second claw-shaped magnetic poles 222 and 232 in the circumferential direction for suppressing the leakage flux of the relevant portions.

What is claimed is:

1. A motor comprising:
   a stator including a stator core having a plurality of teeth extending to a radially inner side, and windings wound around the teeth;

a rotor rotatably provided on an inner side of the stator, the rotor including first and second rotor cores each including a core base having a substantially disc shape and a plurality of claw-shaped magnetic poles, the plurality of claw-shaped magnetic poles being provided at equal intervals in an outer circumferential part of the core base, each of the claw-shaped magnetic poles protruding to a radially outer side and extending in an axial direction, and the core bases of the first and second rotor cores being opposed to each other and the claw-shaped magnetic poles of the first and second rotor cores being alternately disposed in a circumferential direction; and a field magnet disposed between the core bases in the axial direction, the field magnet being magnetized in the axial direction so as to have a first pole at one axial end and a second pole at another axial end thereby causing the claw-shaped magnetic poles of the first rotor core to function as first magnetic poles, and the claw-shaped magnetic poles of the second rotor core to function as second magnetic poles; and a case for housing the stator and the rotor, wherein the case includes a yoke housing and a cover part, the yoke housing includes a cylindrical part, a bottom part, and an opening part, the cover part closes the opening part of the yoke housing, the bottom part of the yoke housing is located at one axial end position facing the rotor in an axial direction of the rotor, the cover part of the case is located at another axial end position facing the rotor in the axial direction of the rotor, the cylindrical part is a magnetic body part, the bottom part is a non-magnetic body part, the cover part is made of a non-magnetic body, and wherein parts of the case that face toward the one axial end having the first pole and another axial end having the second pole of the field magnet are non-magnetic.

2. The motor according to claim 1, wherein the non-magnetic body part is provided on a surface of the yoke housing axially opposed to the rotor.

3. The motor according to claim 2, wherein the non-magnetic body part is provided only in a portion axially opposed to the rotor.

4. The motor according to claim 1, wherein the non-magnetic body part is provided on a surface of the yoke housing axially opposed to the rotor, and a magnetic body part is provided on a back surface of the surface.

5. The motor according to claim 1, wherein the non-magnetic body part is made of a non-magnetic metal.

6. The motor according to claim 1, wherein the bottom part is located at one axial end side of the field magnet, and the cover part is located at another axial end side of the field magnet.

* * * * *